(12) United States Patent
Gong et al.

(10) Patent No.: US 11,476,950 B2
(45) Date of Patent: Oct. 18, 2022

(54) QUANTUM COMMUNICATION METHOD, APPARATUS, AND SYSTEM

(71) Applicants: Huawei Technologies Co., Ltd., Shenzhen (CN); UNIVERSITY OF SCIENCE AND TECHNOLOGY OF CHINA, Anhui (CN)

(72) Inventors: Chen Gong, Hefei (CN); Jinkang Zhu, Hefei (CN); Shangbin Li, Hefei (CN); Rui Ni, Shenzhen (CN)

(73) Assignees: Huawei Technologies Co., Ltd., Shenzhen (CN); University of Science and Technology of China, Hefei (CN)

( * ) Notice: Subject to any disclaimer, the term of this patent is extended or adjusted under 35 U.S.C. 154(b) by 0 days.

(21) Appl. No.: 17/390,473

(22) Filed: Jul. 30, 2021

(65) Prior Publication Data

US 2021/0359765 A1 Nov. 18, 2021

Related U.S. Application Data

(63) Continuation of application No. PCT/CN2019/126351, filed on Dec. 18, 2019.

(30) Foreign Application Priority Data

Feb. 1, 2019 (CN) .......................... 201910105516.5

(51) Int. Cl.
*H04B 10/00* (2013.01)
*H04B 10/70* (2013.01)
(Continued)

(52) U.S. Cl.
CPC ........... *H04B 10/70* (2013.01); *H04B 10/516* (2013.01)

(58) Field of Classification Search
CPC .............................. H04B 10/516; H04B 10/70
See application file for complete search history.

(56) References Cited

U.S. PATENT DOCUMENTS

2005/0123061 A1 6/2005 Smith et al.
2016/0374098 A1* 12/2016 Jöngren ................ H04L 1/0026

FOREIGN PATENT DOCUMENTS

CA 2882288 A1 3/2014
CN 101827376 A 9/2010
(Continued)

OTHER PUBLICATIONS

Guo et al., "Advances on Exploiting Polarization in Wireless Communications: Channels, Technologies, and Applications," IEEE Communications Surveys and Tutorials, vol. 19, No. 1, First Quarter 2017, total 42 pages, XP011641663 (2017).
(Continued)

*Primary Examiner* — Daniel G Dobson
(74) *Attorney, Agent, or Firm* — Leydig, Voit & Mayer, Ltd.

(57) ABSTRACT

A quantum communication method, an apparatus, and a system are provided. The method includes: modulating a first symbol to an $i^{th}$ direction vector of a first electric wave based on a preset mapping relationship, to obtain a second electric wave; and transmitting the second electric wave, where the first electric wave supports M direction vectors, the $i^{th}$ direction vector of the first electric wave is one of the M direction vectors of the first electric wave, the first symbol is a symbol corresponding to first data, the $i^{th}$ direction vector of the first electric wave corresponds to an $i^{th}$ distribution result, the $i^{th}$ distribution result is obtained by converting the second electric wave into an energy quantum. The first symbol may be modulated to a direction vector of
(Continued)

the first electric wave, and this application is compatible with the conventional technology.

20 Claims, 14 Drawing Sheets

(51) Int. Cl.
   *H04B 10/516* (2013.01)
   *H04J 14/00* (2006.01)

(56) References Cited

FOREIGN PATENT DOCUMENTS

| CN | 102355447 A | 2/2012 |
|----|-------------|--------|
| CN | 104301271 A | 1/2015 |
| CN | 104601214 A | 5/2015 |
| CN | 105490805 A | 4/2016 |
| CN | 105794132 A | 7/2016 |
| CN | 105978840 A | 9/2016 |
| CN | 106130655 A | 11/2016 |
| CN | 106506089 A | 3/2017 |
| CN | 106972907 A | 7/2017 |
| CN | 107688194 A | 2/2018 |
| CN | 108134756 A | 6/2018 |
| CN | 108234028 A | 6/2018 |
| CN | 108234380 A | 6/2018 |
| JP | 5631136 B2 | 11/2014 |
| WO | 2014005257 A1 | 1/2014 |

OTHER PUBLICATIONS

Rosales-Guzmán et al., "A review of complex vector light fields and their applications," Journal of Optics, vol. 20, No. 12, total 32 pages, XP055563637 (Nov. 15, 2018).

Gisin, "Quantum Communication," arxiv. org, Cornell University Library, 201 Olin Library Cornell University Ithaca, NY 14853, total 2 pages, XP081347242 (Jul. 18, 2015).

\* cited by examiner

QUANTUM COMMUNICATION METHOD, APPARATUS, AND SYSTEM

CROSS-REFERENCE TO RELATED APPLICATIONS

This application is a continuation of International Patent Application No. PCT/CN2019/126351, filed on Dec. 18, 2019, which claims priority to Chinese Patent Application No. 201910105516.5, filed on Feb. 1, 2019. The disclosures of the aforementioned applications are hereby incorporated by reference in their entireties.

TECHNICAL FIELD

Embodiments of this application relate to the field of communications technologies, and in particular, to a quantum communication method, an apparatus, and a system.

BACKGROUND

With rapid development of the Internet, an internet of things, automatic driving, a mobile robot, and a multifunction terminal, requirements for wireless communication are increasing, and a quantity of communications apparatuses also increases explosively. Therefore, requirements on a transmission capability of a wireless communications system are also increasing.

Currently, a wireless link in wireless communication is based on an electromagnetic wave. According to the Maxwell's electromagnetic theory, an electric field and a magnetic field that oscillate excite each other alternately, and the electric field and the magnetic field are propagated far away from a wave source in a form of an electromagnetic wave. In a communications apparatus at a transmit end in a wireless communications system in the conventional technology, to-be-sent data is usually modulated to a phase, a frequency, or an amplitude of a carrier, to obtain a modulated analog waveform, and a transmitting antenna excites an electromagnetic wave to be radiated into a radio channel. That is, in the conventional technology, the to-be-sent data may be modulated to three dimensions of the carrier. However, due to the increasing requirements for wireless communication, the three dimensions to which the data can be modulated in the conventional technology cannot satisfy increasing requirements of wireless transmission.

SUMMARY

This application provides a quantum communication method, an apparatus, and a system, to increase a dimension in which to-be-sent data is modulated to a carrier, to satisfy increasing requirements of wireless transmission.

According to a first aspect, this application provides a quantum communication method. The method includes: modulating a first symbol to an $i^{th}$ direction vector of a first electric wave based on a preset mapping relationship, to obtain a second electric wave; and transmitting the second electric wave, where the first symbol is a symbol corresponding to first data, the first electric wave supports M direction vectors, the $i^{th}$ direction vector of the first electric wave is one of the M direction vectors of the first electric wave, the $i^{th}$ direction vector of the first electric wave corresponds to an $i^{th}$ distribution result, the $i^{th}$ distribution result is obtained by converting the second electric wave into an energy quantum, M is a positive integer, and i is an integer.

Based on this solution, compared with the conventional technology in which a symbol is modulated to three dimensions: a phase, an amplitude, and a frequency of a carrier, in this application, the first symbol may be modulated to a direction vector of the first electric wave, to increase a dimension in which the symbol is modulated to an electric wave, thereby helping satisfy increasing requirements of wireless transmission. Further, in this solution, the symbol is modulated to the direction vector of the first electric wave, and a manner, to be specific, modulating the symbol to the phase, the amplitude, and the frequency, in the conventional technology is not changed. Therefore, this solution is compatible with the dimensions to which the symbol can be modulated in the conventional technology.

In a possible implementation, a sequence number i of a direction vector that is of the first electric wave and that corresponds to the first symbol may be determined based on the preset mapping relationship; and the first symbol may be modulated to the $i^{th}$ direction vector of the first electric wave, to obtain the second electric wave, where the direction vector that is of the first electric wave and whose sequence number is i is the $i^{th}$ direction vector of the first electric wave.

Further, a frequency and a bandwidth for transmitting the second electric wave may be determined based on a user identity corresponding to the first symbol, and the second electric wave is transmitted based on the frequency and the bandwidth for transmitting the second electric wave.

In a possible implementation, a polarized transmitting antenna for transmitting the second electric wave may be further determined based on the sequence number i of the direction vector of the first electric wave; and the second electric wave may be transmitted by using the determined polarized transmitting antenna.

According to a second aspect, this application provides a quantum communication method. The method includes: receiving a second electric wave; converting the second electric wave into N energy quantum sets; determining a first distribution result of the N energy quantum sets, and determining, based on the first distribution result, that the second electric wave corresponds to an $i^{th}$ direction vector of a first electric wave; and determining a first symbol based on the $i^{th}$ direction vector of the first electric wave and a preset mapping relationship, where the second electric wave is obtained by modulating the first symbol to one of M direction vectors of the first electric wave based on the preset mapping relationship, the first symbol is a symbol corresponding to first data, the $i^{th}$ direction vector is one of the M direction vectors of the first electric wave, one energy quantum set is an empty set or includes at least one energy quantum, M and N are both positive integers, and i is an integer.

Based on this solution, when strength of the received second electric wave is relatively weak (in other words, power of the second electric wave is relatively low), and even an analog waveform of the second electric wave cannot be detected, the second electric wave may be converted into the N energy quantum sets, and statistics about the first distribution result of the N energy quantum sets may be collected, so that the $i^{th}$ direction vector that is of the first electric wave and that corresponds to the second electric wave is determined. That is, the first symbol corresponding to the $i^{th}$ direction vector may be determined based on the preset mapping relationship, so that the first data can be determined. In this way, the first symbol carried on the second electric wave whose energy is relatively weak is determined. In this way, energy of a weak electric wave can be fully used to extract data carried on the electric wave, thereby helping improve signal receiving sensitivity.

In a possible implementation, the second electric wave may be converted into the N energy quantum sets based on an energy conversion relationship between an electric wave and an energy quantum.

Further, a quantity of energy quanta in each of the N energy quantum sets may be determined, to obtain N second distribution results, where one energy quantum set corresponds to one second distribution result; and statistics about the N second distribution results may be collected, to obtain the first distribution result.

In a possible implementation, for a $k^{th}$ time window in N time windows, the second electric wave may be converted into one energy quantum set, where k takes each value from 1 to N, and an accumulated value of the N time windows is duration of transmitting the first symbol.

In a possible implementation, that the second electric wave corresponds to the $i^{th}$ direction vector of the first electric wave may be determined based on the first distribution result and M pre-stored eigenstates $q_i$, where the eigenstate $q_i$ is a distribution result of the N energy quantum sets that is obtained when the $i^{th}$ direction vector of the first electric wave carries no symbol, the M eigenstates $q_i$ correspond one-to-one to the M direction vectors of the first electric wave, and i takes each value from 1 to M.

Specifically, M convolutional peak values $\hat{s}_1$ may be obtained according to $\hat{s}_1 = \mathrm{argmax}_i \, p(s)*q_i$; and that an i value corresponding to a largest value in the M convolutional peak values $\hat{s}_1$ is a sequence number i of a direction vector of the first electric wave is determined, where p(s) is the first distribution result, the direction vector that is of the first electric wave and whose sequence number is i is the $i^{th}$ direction vector of the first electric wave, and * indicates mathematical convolution operation. The sequence number of the direction vector of the first electric wave for carrying the first symbol may be accurately determined by performing a correlation operation on the first distribution result and the eigenstate.

In a possible implementation, the second electric wave may be separately received by using M polarized receiving antennas.

In a possible implementation, any one or more of the following content may be performed on the second electric wave: filtering the second electric wave; amplifying the second electric wave; and demodulating the second electric wave. This helps reduce interference to converting the second electric wave into the energy quantum.

In a possible implementation, the second electric wave is converted into the N energy quantum sets when a temperature of an environment in which the second electric wave is located is lower than a temperature threshold. A lower temperature may reduce background thermal noise, thereby helping improve accuracy of collecting statistics about a quantity of quanta in the energy quantum set.

According to a third aspect, this application provides a communications apparatus, including a direction vector modulator and a transmitting antenna. The direction vector modulator is configured to modulate a first symbol to an $i^{th}$ direction vector of a first electric wave based on a preset mapping relationship, to obtain a second electric wave. The transmitting antenna is configured to transmit the second electric wave from the direction vector modulator. The first symbol is a symbol corresponding to first data, the first electric wave supports M direction vectors, the $i^{th}$ direction vector of the first electric wave is one of the M direction vectors of the first electric wave, the $i^{th}$ direction vector of the first electric wave corresponds to an $i^{th}$ distribution result, the $i^{th}$ distribution result is obtained by converting the second electric wave into an energy quantum, M is a positive integer, and i is an integer.

Based on the foregoing solution, compared with the conventional technology in which a symbol is modulated to three dimensions: a phase, an amplitude, and a frequency of a carrier, in the foregoing solution, the first symbol may be modulated to a direction vector of the first electric wave by using the direction vector modulator. That is, the first symbol may be carried on the direction vector of the first electric wave. In this way, a dimension in which a symbol is modulated to an electric wave is increased, thereby helping satisfy increasing requirements of wireless transmission. Further, in the foregoing solution, the symbol is modulated to the direction vector of the first electric wave, and a manner, to be specific, modulating the symbol to the phase, the amplitude, and the frequency, in the conventional technology is not changed. Therefore, this solution is compatible with the dimensions to which the symbol can be modulated in the conventional technology.

In a possible implementation, the direction vector modulator is specifically configured to: determine, based on the preset mapping relationship, a sequence number i of a direction vector that is of the first electric wave and that corresponds to the first symbol; and modulate the first symbol to the $i^{th}$ direction vector of the first electric wave, to obtain the second electric wave, where the direction vector that is of the first electric wave and whose sequence number is i is the $i^{th}$ direction vector of the first electric wave.

In a possible implementation, the communications apparatus further includes a frequency domain resource selector. The frequency domain resource selector is configured to determine, based on a user identity corresponding to the first symbol, a frequency and a bandwidth for transmitting the second electric wave. The transmitting antenna is specifically configured to transmit the second electric wave based on the frequency and the bandwidth for transmitting the second electric wave.

In a possible implementation, the transmitting antenna includes M polarized transmitting antennas and a polarized transmitting antenna selector. The polarized transmitting antenna selector is configured to determine, based on the sequence number i from the direction vector modulator, a polarized transmitting antenna for transmitting the second electric wave. The second electric wave is transmitted by using the determined polarized transmitting antenna.

According to a fourth aspect, this application provides a communications apparatus, including a receiving antenna, an electric wave energy quantum converter, and an energy quantum detector. The receiving antenna is configured to receive a second electric wave, where the second electric wave is obtained by modulating a first symbol to one of M direction vectors of a first electric wave based on a preset mapping relationship, the first symbol is a symbol corresponding to first data, and M is a positive integer. The electric wave energy quantum converter is configured to convert the second electric wave from the receiving antenna into N energy quantum sets, where one energy quantum set is an empty set or includes at least one energy quantum, and N is a positive integer. The energy quantum detector is configured to: determine a first distribution result of the N energy quantum sets from the electric wave energy quantum converter, determine, based on the first distribution result, that the second electric wave corresponds to an $i^{th}$ direction vector of the first electric wave, and determine the first symbol based on the $i^{th}$ direction vector of the first electric wave and the preset mapping relationship, where the $i^{th}$ direction vector is one of the M direction vectors of the first electric wave, and i is an integer.

Based on this solution, when strength of the second electric wave received by the communications apparatus is relatively weak, and even a waveform of the second electric wave cannot be detected, the second electric wave is converted into the N energy quantum sets, and statistics about the first distribution result of the N energy quantum sets are collected, so that the $i^{th}$ direction vector that is of the first electric wave and that corresponds to the second electric wave may be determined. That is, the first symbol corresponding to the $i^{th}$ direction vector may be determined based on the preset mapping relationship, so that the first data can be determined. In this way, the first symbol carried on the second electric wave having relatively weak energy is determined, so that energy of a weak electric wave can be fully used to extract data carried on the electric wave. This helps improve sensitivity of receiving a signal by the communications apparatus.

In a possible implementation, the electric wave energy quantum converter is specifically configured to convert the second electric wave into the N energy quantum sets based on an energy conversion relationship between an electric wave and an energy quantum.

Optionally, a value of energy of an energy quantum is equal to a Planck's constant multiplied by a frequency of radiating an electromagnetic wave. That is, E=hv, where E represents the energy of the energy quantum, h is the Planck's constant, and v is the frequency of radiating the electromagnetic wave.

In a possible implementation, the electric wave energy quantum converter is specifically configured to convert, for a $k^{th}$ time window in N time windows, the second electric wave into one energy quantum set, where k takes each value from 1 to N, and an accumulated value of the N time windows is duration of transmitting the first symbol.

In a possible implementation, the energy quantum detector includes an energy quantum counter module and an energy quantum statistics module. The energy quantum counter module is configured to determine a quantity of energy quanta in each of the N energy quantum sets from the electric wave energy quantum converter; and the energy quantum statistics module is configured to obtain N second distribution results based on the quantity that is of energy quanta in each of the N energy quantum sets and that is from the energy quantum counter module, and collect statistics about the N second distribution results, to obtain the first distribution result, where one energy quantum set corresponds to one second distribution result.

In a possible implementation, the energy quantum detector further includes a state cross-correlation operation module. The state cross-correlation operation module is configured to determine, based on the first distribution result from the energy quantum statistics module and M pre-stored eigenstates $q_i$, that the second electric wave corresponds to the $i^{th}$ direction vector of the first electric wave, where the eigenstate $q_i$ is a distribution result of the N energy quantum sets that is obtained when the $i^{th}$ direction vector of the first electric wave carries no symbol, the M eigenstates $q_i$ correspond one-to-one to the M direction vectors of the first electric wave, and i takes each value from 1 to M.

In a possible implementation, the state cross-correlation operation module is specifically configured to obtain M convolutional peak values $\hat{s}_1$ according to $\hat{s}_1 = \text{argmax}_i \, p(s)*q_i$, where p(s) is the first distribution result; and determine that an i value corresponding to a largest value in the M convolutional peak values $\hat{s}_1$ is a sequence number i of a direction vector of the first electric wave, where the direction vector that is of the first electric wave and whose sequence number is i is the $i^{th}$ direction vector of the first electric wave.

In a possible implementation, the receiving antenna includes M polarized receiving antennas; and the M polarized receiving antennas are configured to separately receive the second electric wave.

In a possible implementation, the communications apparatus further includes any one or more of the following content: a filter, configured to filter the second electric wave from the receiving antenna; an amplifier, configured to amplify the second electric wave from the filter; and a demodulator, configured to demodulate the second electric wave from the amplifier.

In a possible implementation, the communications apparatus further includes a refrigerator, configured to refrigerate the electric wave energy quantum converter.

According to a fifth aspect, this application provides a communications apparatus. The communications apparatus includes at least one transceiver and at least one processor. Optionally, the communications apparatus further includes at least one memory. The memory is configured to store an instruction. The processor is configured to: execute the instruction stored in the memory, and control the transceiver to receive a signal and send a signal. When the processor executes the instruction stored in the memory, the communications apparatus is configured to perform the method according to any one of the first aspect or the possible implementations of the first aspect, or is configured to perform the method according to any one of the second aspect or the possible implementations of the second aspect.

According to a sixth aspect, this application provides a communications apparatus, configured to implement the method according to any one of the first aspect or the possible implementations of the first aspect, or configured to implement the method according to any one of the second aspect or the possible implementations of the second aspect. The communications apparatus includes corresponding function modules, respectively configured to implement steps in the foregoing method. A function may be implemented by using hardware, or may be implemented by hardware executing corresponding software. The hardware or software includes one or more modules corresponding to the function.

In a possible implementation, a structure of the communications apparatus includes a processing unit and a transceiver unit. The units may perform corresponding functions in the foregoing method example. For details, refer to detailed descriptions in the method example. Details are not described herein.

According to a seventh aspect, this application provides a communications system. The communications system may include the communications apparatus according to the third aspect and the communications apparatus according to the fourth aspect.

According to an eighth aspect, this application provides a computer storage medium. The computer storage medium stores an instruction. When the instruction is run on a computer, the computer is enabled to perform the method according to any one of the first aspect or the possible implementations of the first aspect, or the computer is enabled to perform the method according to any one of the second aspect or the possible implementations of the second aspect.

According to a ninth aspect, an embodiment of this application provides a computer storage medium. The computer storage medium stores an instruction. When the instruction is run on a computer, the computer is enabled to perform the method according to any one of the first aspect or the possible implementations of the first aspect, or the computer is enabled to perform the method according to any one of the second aspect or the possible implementations of the second aspect.

BRIEF DESCRIPTION OF DRAWINGS

FIG. 3c-1 and FIG. 3c-2 are a schematic architectural diagram of another communications apparatus according to this application;

DESCRIPTION OF EMBODIMENTS

It should be understood that, in this application, "at least one" means one or more, and "a plurality of" means two or more. The term "and/or" is used to describe an association relationship between associated objects, and indicates that three relationships may exist. For example, "A and/or B" may represent the following three cases: Only A exists, only B exists, and both A and B exist, where A and B may be singular or plural. The character "/" generally indicates an "or" relationship between the associated objects. "At least one of the following" or a similar expression thereof indicates any combination of these items, including a single item or any combination of a plurality of items. For example, at least one of a, b, or c may indicate a, b, c, "a and b", "a and c", "b and c", or "a, b, and c", where a, b, and c may be singular or plural.

Figure 1:
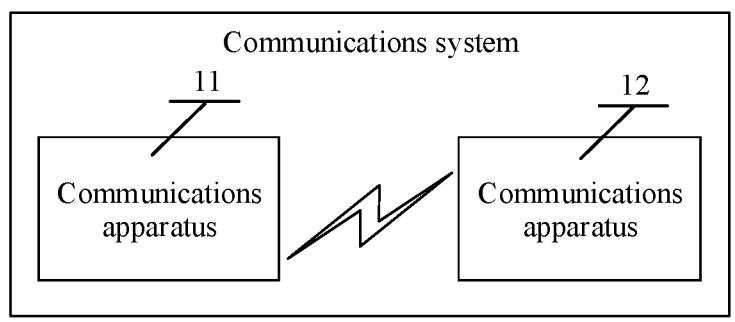
FIG. 1 is a schematic architectural diagram of a communications system according to this application.

FIG. 1 is an example schematic architectural diagram of a communications system according to this application. The communications system includes at least two communications apparatuses. In FIG. 1, an example in which the communications system includes a communications apparatus 11 and a communications apparatus 12 is used for description. The communications apparatus 11 and the communications apparatus 12 may communicate with each other in a wireless manner. For example, the communications apparatus 11 and the communications apparatus 12 may communicate with each other over a Uu air interface or a sidelink (SL) air interface. The communications apparatus 11 and the communications apparatus 12 may be same communications apparatuses, or may be different communications apparatuses. The communications system in this application includes but is not limited to a universal mobile telecommunications system (UMTS), a long term evolution (LTE) wireless communications system, a 5th generation (5G) mobile communications system, code division multiple access (CDMA) IS-95, code division multiple access (CDMA) 2000, time division-synchronous code division multiple access (TD-SCDMA), wideband code division multiple access (WCDMA), a personal handy-phone system (PHS), wireless fidelity (Wi-Fi) specified in the 802.11 series protocols, worldwide interoperability for microwave access (WiMAX), another communications system that may emerge in the future, or the like. In a case, the communications apparatus 11 may be used as a transmit end, and the communications apparatus 12 may be used as a receive end. In another case, the communications apparatus 11 may be used as a receive end, and the communications apparatus 12 may be used as a transmit end.

Communications apparatuses (for example, the communications apparatus 11 and the communications apparatus 12) may be terminal devices, base stations, satellites, or the like.

The terminal device may also be referred to as a terminal, and may be a wireless terminal. The wireless terminal refers to a device providing voice and/or data connectivity for a user, a handheld device having a wireless connection function, or another processing device connected to a wireless modem. The wireless terminal may communicate with one or more core networks through a radio access network (RAN). The wireless terminal may be a mobile terminal such as a mobile phone (also referred to as a "cellular" phone) and a computer having a mobile terminal. For example, the wireless terminal may be a portable, pocket-sized, handheld, computer built-in, or in-vehicle mobile apparatus that exchanges a voice and/or data with the radio access network. For example, the wireless terminal may be a device such as a personal communications service (PCS) phone, a cordless phone, a session initiation protocol (SIP) phone, a wireless local loop (WLL) station, or a personal digital assistant (PDA). The wireless terminal may also be referred to as a subscriber unit, a subscriber station, a mobile station, a mobile platform (mobile), a remote station, an access point, a remote terminal, an access terminal, a user terminal, a user agent, a user device, or user equipment, or may be a sensor terminal.

The base station may be a macro evolved NodeB (eNB) in UMTS, a macro base station eNB in an LTE wireless communications system, a gNB in a 5G mobile communications system, a base band unit pool (BBU pool) and a radio remote unit (RRU) in C-RAN networking, a base transceiver station (BTS) and/or a base station controller (BSC), a NodeB (NodeB, NB) and/or a radio network controller (RNC) in a TD-SCDMA system, or a NodeB (NB) and/or a radio network controller (RNC) in a WCDMA system.

Figure 1A:
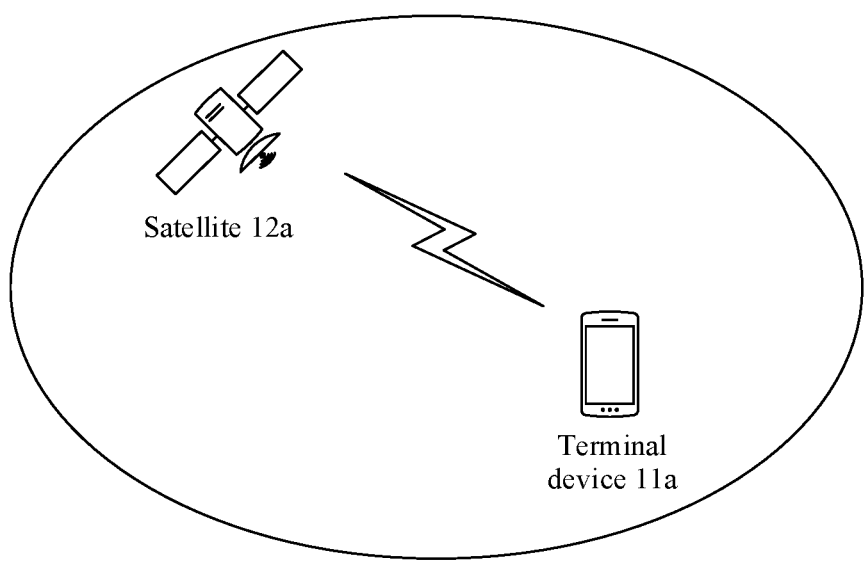
FIG. 1a is a schematic architectural diagram of a long distance communication system including a satellite and a terminal device according to this application.

The communications system shown in FIG. 1 may be used in a scenario in which a signal transmitted between the communications apparatus 11 and the communications apparatus 12 is relatively weak. For example, FIG. 1a is a schematic architectural diagram of a long distance communication system including a satellite and a terminal device according to this application. In the communications system, there may be a plurality of terminal devices, and there may also be a plurality of satellites. For ease of description of the solution, the communications system shown in FIG. 1a includes, for example, a terminal device 11a and a satellite 12a. A distance between the terminal device 11a and the satellite 12a is relatively long. Energy of an electric wave received by the terminal device 11a from the satellite 12a may be relatively weak. Correspondingly, energy of an electric wave received by the satellite 12a from the terminal device 11a may also be relatively weak. The terminal device 11a may be one of the communications apparatus 11 and the communications apparatus 12 in FIG. 1, and the satellite 12a may be the other one of the communications apparatus 11 and the communications apparatus 12 in FIG. 1.

Figure 1B:
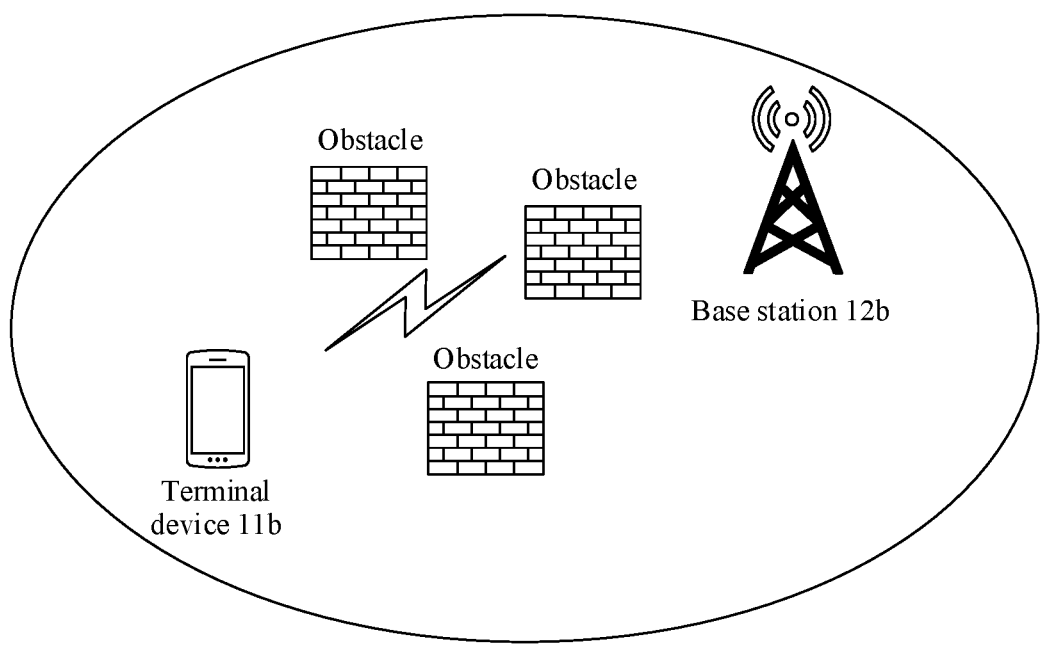
FIG. 1b is a schematic architectural diagram of a communications system in which there are a plurality of obstacles between a terminal device and a base station according to this application.

For example, FIG. 1b is a schematic architectural diagram of a communications system in which there are a plurality of obstacles between a terminal device and a base station according to this application. In the communications system, there may be a plurality of terminal devices, and there may also be a plurality of base stations. For ease of description of the solution, the communications system in FIG. 1b includes, for example, a terminal device 11b and a base station 12b. The terminal device 11b and the base station 12b may communicate with each other over a Uu air interface. There are a relatively large quantity of obstacles between the terminal device 11b and the base station 12b. Energy of an electric wave received by the terminal device 11b from the base station 12b may be relatively weak due to blocking of the obstacles. Correspondingly, energy of an electric wave received by the base station 12b from the terminal device 11b may also be relatively weak due to blocking of the obstacles. The terminal device 11b may be one of the communications apparatus 11 and the communications apparatus 12 in FIG. 1, and the base station 12b may be the other one of the communications apparatus 11 and the communications apparatus 12 in FIG. 1. The terminal device 11b may be the same as or different from the terminal device 11a in FIG. 1a.

Figure 2:
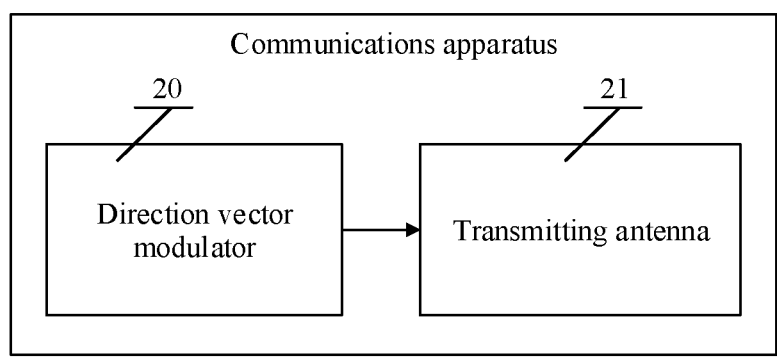
FIG. 2 is a schematic architectural diagram of a communications apparatus according to this application.
Figure 2A:
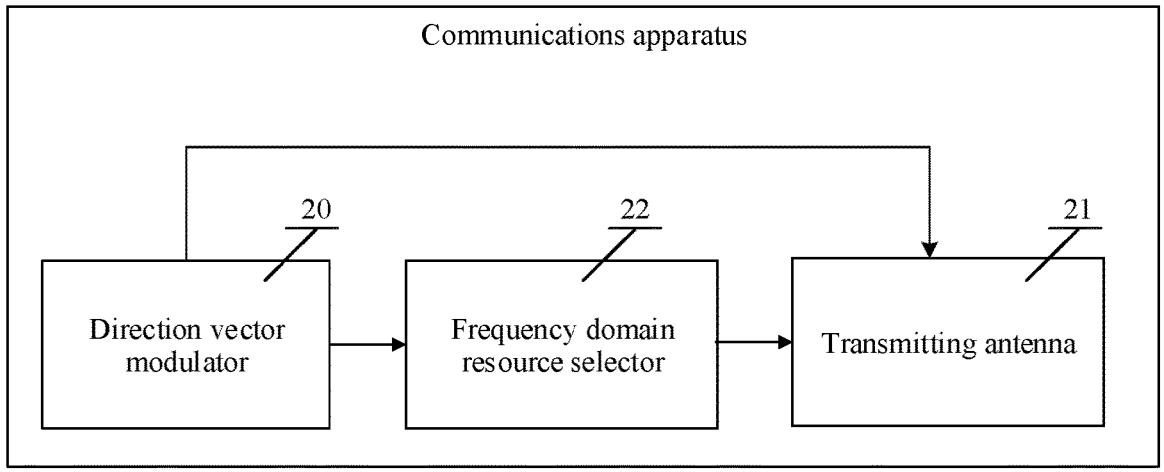
FIG. 2a is a schematic architectural diagram of another communications apparatus according to this application.
Figure 2B:
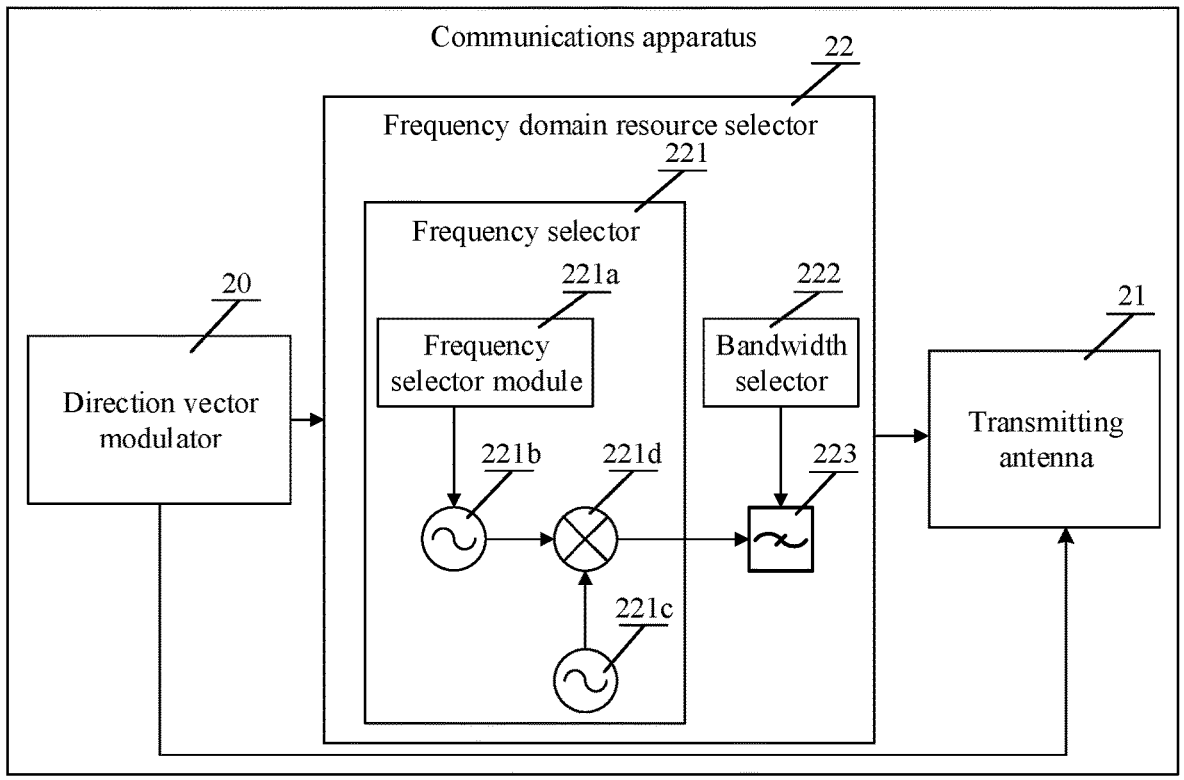
FIG. 2b is a schematic architectural diagram of another communications apparatus according to this application.
Figure 2C:
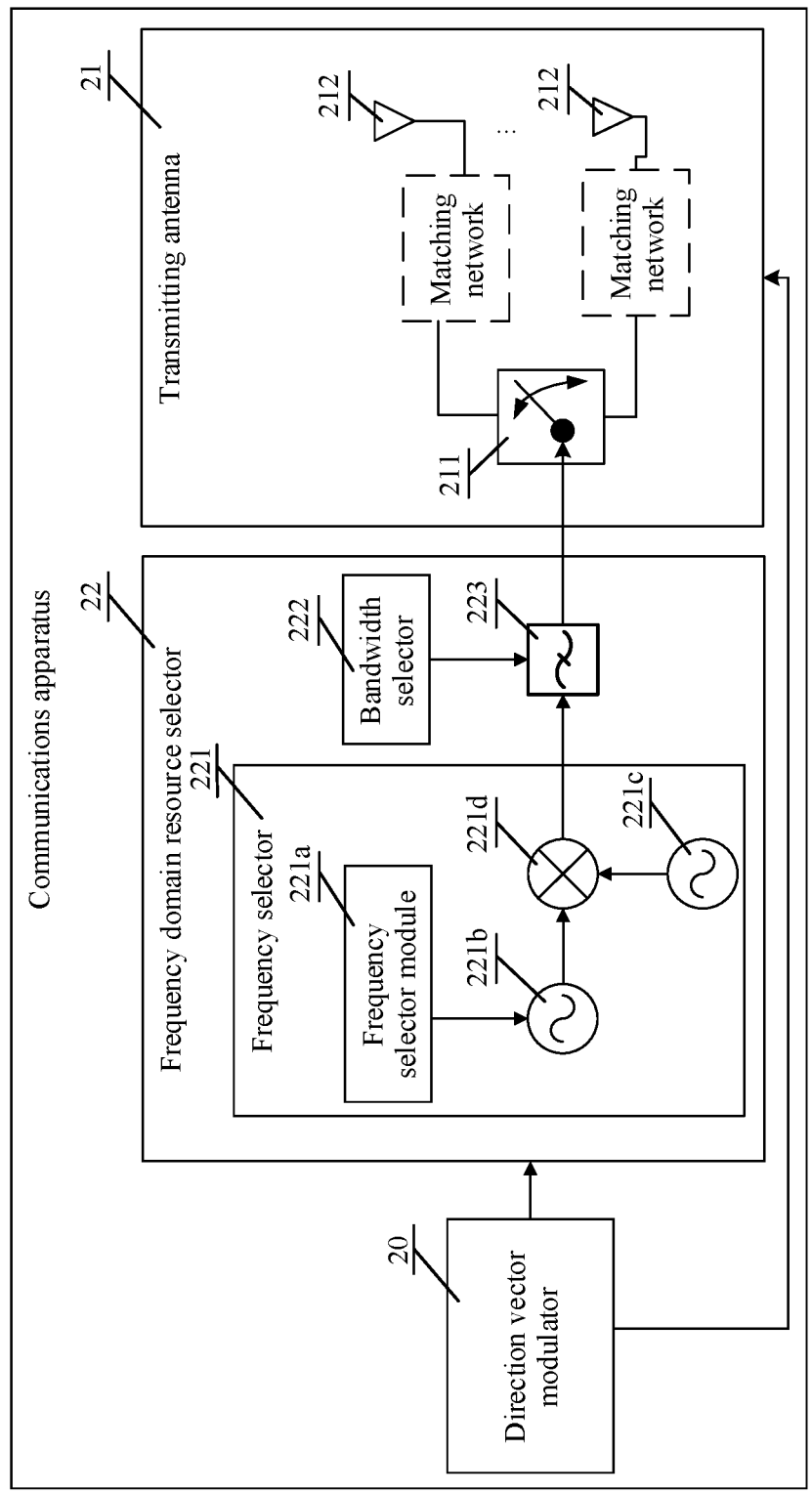
FIG. 2c is a schematic architectural diagram of still another communications apparatus according to this application.
Figure 3:
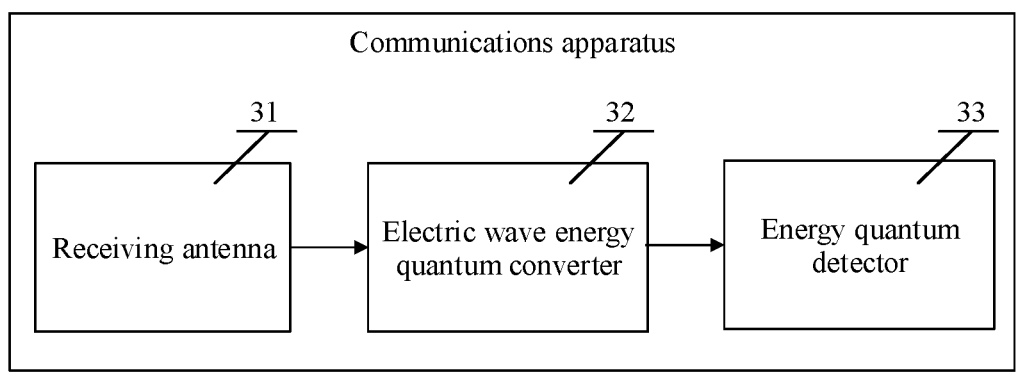
FIG. 3 is a schematic architectural diagram of another communications apparatus according to this application.

FIG. 2 to FIG. 2c are schematic structural diagrams of different communications apparatuses according to this application, and all the communications apparatuses can be configured to resolve the problem in the background. The communications apparatus shown in each of FIG. 2 to FIG. 2c may be either of the communications apparatus 11 and the communications apparatus 12 shown in FIG. 1, may be either of the terminal device 11a and the satellite 12a shown in FIG. 1a, or may be either of the terminal device 11b and the base station 12b shown in FIG. 1b. FIG. 3 to FIG. 3c-2 are schematic structural diagrams of different communications apparatuses according to this application, and all the communications apparatuses can be configured to resolve a prior-art problem that a communications apparatus cannot obtain, when receiving an electric wave with relatively weak energy, a symbol (or data) carried on the electric wave. The communications apparatus shown in each of FIG. 3 to FIG. 3c-2 may be either of the communications apparatus 11 and the communications apparatus 12 shown in FIG. 1, may be either of the terminal device 11a and the satellite 12a shown in FIG. 1a, or may be either of the terminal device 11b and the base station 12b shown in FIG. 1b. Descriptions are separately provided below.

FIG. 2 is an example schematic architectural diagram of a communications apparatus according to this application. As shown in FIG. 2, the communications apparatus includes a direction vector modulator 20 and a transmitting antenna 21. The direction vector modulator 20 is configured to modulate a first symbol to an $i^{th}$ direction vector of a first electric wave based on a preset mapping relationship, to obtain a second electric wave. The transmitting antenna 21 is configured to transmit the second electric wave from the direction vector modulator 20.

The first symbol is a symbol corresponding to first data. The first data is to-be-sent data. In a possible implementation, the first data may be modulated into at least one symbol based on a specified modulation scheme. The first symbol is one of the at least one symbol. The specified modulation scheme may be 16 quadrature amplitude modulation (QAM), 64QAM, or the like. This is not limited in this application. The first electric wave may support M direction vectors. It may also be understood as that a wireless communications system including the communications apparatus may support M quantum states. One symbol may be modulated to one direction vector of the first electric wave. That is, one direction vector of the first electric wave may carry one symbol. One direction vector of the first electric wave may correspond to one energy quantum distribution result, and the energy quantum distribution result may be obtained by converting the second electric wave into an energy quantum. For example, the $i^{th}$ direction vector of the first electric wave may correspond to an $i^{th}$ distribution result. M is a positive integer, and i is an integer.

In a possible implementation, an amount L of bit information of the first symbol may be determined by using $L=\log_2 M$. It may also be understood as that L bits of binary digits 0 or 1 are used as a group, and are determined as a symbol. It may be understood that an amount of bit information that can be carried in each of M directions supported by the first electric wave is L.

In a possible implementation, the direction vector modulator 20 is configured to: determine, based on the preset mapping relationship, a sequence number i of a direction vector that is of the first electric wave and that corresponds to the first symbol, and modulate the first symbol to the direction vector whose sequence number is i and that is of the first electric wave. The direction vector that is of the first electric wave and whose sequence number is i is the $i^{th}$ direction vector of the first electric wave. That is, the first symbol is modulated to the $i^{th}$ direction vector of the first electric wave.

For example, it is assumed that the first electric wave supports four direction vectors that are respectively 1, 2, 3, and 4. Amount L of bit information of a symbol of the first data=$\log_2 4=2$. Symbols corresponding to the first data include 00, 01, 10, and 11. The preset mapping relationship may be shown in Table 1.

TABLE 1

Mapping relationship between the sequence numbers
of the direction vectors of the first electric wave
and the symbols corresponding to the first data

|  | Sequence numbers i of the direction vectors of the first electric wave | | | |
| --- | --- | --- | --- | --- |
|  | 1 | 2 | 3 | 4 |
| Symbols corresponding to the first data | 00 | 01 | 10 | 11 |

As shown in Table 1, the sequence numbers of the direction vectors of the first electric wave correspond one-to-one to the symbols corresponding to the first data. That is, a symbol corresponding to the first data may be modulated to a corresponding direction vector of the first electric wave. For example, a direction vector that is of the first electric wave and whose sequence number is 1 corresponds to the symbol 00 corresponding to the first data. Therefore, the symbol 00 may be modulated to a first direction vector of the first electric wave. Based on a same principle, the symbol 01 may be modulated to a second direction vector of the first electric wave, the symbol 10 may be modulated to the third direction vector of the first electric wave, and the symbol 11 may be modulated to the fourth direction vector of the first electric wave.

In a possible implementation, the transmitting antenna 21 may radiate the second electric wave into a radio channel. For example, the second electric wave may be represented by using Formula 1 below. Optionally, the second electric wave is a pulse electric wave.

$$s_i(t) = \uparrow_i(t) \times \sqrt{\frac{2E(t)}{T}} \cos(v_i t + 2\pi k/K) \quad \text{Formula 1}$$

k represents a $k^{th}$ phase, k=1, 2, ... K, t represents time, 0≤t≤T, $\uparrow_i$(t) represents direction vector information of the second electric wave that is obtained by modulating the first symbol to the $i^{th}$ direction vector of the first electric wave, and i=1, 2, ..., M.

Based on the foregoing solution, compared with the conventional technology in which a symbol is modulated to three dimensions: a phase, an amplitude, and a frequency of a carrier, in the foregoing solution, the first symbol may be modulated to a direction vector of the first electric wave by using the direction vector modulator. That is, the first symbol may be carried on the direction vector of the first electric wave. In this way, a dimension in which a symbol is modulated to an electric wave is increased, thereby helping improve a data transmission capability of a communications apparatus in a wireless communications system. Further, in the foregoing solution, the symbol is modulated to the direction vector of the first electric wave, and a manner, to be specific, modulating the symbol to the phase, the amplitude, and the frequency, in the conventional technology is not changed. Therefore, this solution is compatible with the dimensions to which the symbol can be modulated in the conventional technology.

FIG. 2*a* is a schematic architectural diagram of another communications apparatus according to this application. The communications apparatus includes a direction vector modulator 20, a transmitting antenna 21, and a frequency domain resource selector 22. The frequency domain resource selector 22 is configured to determine, based on a user identity corresponding to a first symbol, a frequency and a bandwidth for transmitting a second electric wave. The transmitting antenna 21 is configured to transmit the second electric wave based on the frequency and the bandwidth for transmitting the second electric wave. For descriptions of the direction vector modulator 20, refer to the foregoing descriptions in FIG. 2. Details are not described herein again.

For example, the frequency domain resource selector 22 may first determine the user identity corresponding to the first symbol, and determine, based on the determined user identity, a frequency v and a bandwidth B for transmitting the second electric wave. For example, if the frequency domain resource selector 22 determines a user identity A corresponding to the first symbol, the frequency domain resource selector 22 may determine, based on a preset relationship between a user identity and a frequency and between the user identity and a bandwidth, a frequency and a bandwidth that correspond to the user identity A. In a possible implementation, when the second electric wave is converted into an energy quantum, because energy of one energy quantum $F_v$=hv, where h is a Planck's constant, and v is a frequency of a carrier of the second electric wave, the selected frequency v influences a type of the energy quantum. The bandwidth B may represent a difference between a maximum value and a minimum value of the frequency. A relatively small bandwidth B that is selected helps a communications apparatus at a receive end convert an electric wave into an energy quantum, and helps improve accuracy of a statistical result of an energy quantum quantity. In addition, the communications apparatus at the receive end converts the second electric wave into the energy quantum to extract the first symbol carried on the second electric wave. Therefore, the communications apparatus can select a relatively narrow bandwidth for transmitting the second electric wave.

The following separately describes in detail the function modules shown in FIG. 2 and FIG. 2*a*, to provide an example of a specific implementation solution.

1. Frequency Domain Resource Selector 22

FIG. 2*b* is a schematic architectural diagram of another communications apparatus according to this application. The communications apparatus includes a direction vector modulator 20, a transmitting antenna 21, and a frequency domain resource selector 22. The frequency domain resource selector 22 may include a frequency selector 221 and a bandwidth selector 222. Optionally, the frequency domain resource selector 22 further includes a filter 223. The frequency selector 221 may include a frequency selector module 221*a*, a frequency generator 221*b*, a local oscillator (LO) 221*c*, and a frequency mixer 221*d*. For the direction vector modulator 20 and the transmitting antenna 21, refer to the foregoing descriptions in FIG. 2 or FIG. 2*a*. Details are not described herein again.

The frequency selector 221 is configured to determine a frequency for transmitting the second electric wave. In a possible implementation, the frequency for transmitting the second electric wave may be determined based on a user identity corresponding to a first symbol and a preset rule. Specifically, the frequency selector module 221*a* is configured to select a first frequency based on the user identity corresponding to the first symbol, and input the selected first frequency into the frequency generator 221*b*. The frequency generator 221*b* is configured to generate a first signal, namely, a baseband signal, based on the first frequency, and input the first signal to the frequency mixer 221*d*. The local oscillator 221c is configured to generate a second signal, and input the second signal into the frequency mixer 221d. The frequency mixer 221d is configured to perform frequency mixing processing on the received first signal and second signal to obtain a third signal, and input the third signal to the filter 223.

For example, the frequency selector module 221a in the frequency selector 221 may be configured to select a first frequency ($v_A$=0.001 GHz) according to the preset rule, and input the selected first frequency into the frequency generator 221b. The frequency generator 221b is configured to: generate the first signal based on the first frequency, where a frequency of the generated first signal is 0.001 GHz; and input the first signal cos $v_A$ into the frequency mixer 221d. The local oscillator 221c is configured to: generate a second signal cos $v_{LO}$, where $v_{LO}$=60 GHz, and input the second signal into the frequency mixer 221d. The frequency mixer 221d is configured to perform frequency mixing processing on the received first signal cos $v_A$ and second signal cos $v_w$ to obtain a third signal cos $v_A$ cos $v_{LO}$=[cos($v_A$+$v_{LO}$)+cos($v_A$−$v_w$)]/2, and that frequencies of the third signal are $v_A$+$v_{LO}$=60.001 GHz and $v_A$−$v_{LO}$=59.999 GHz may be determined.

The bandwidth selector 222 is configured to determine, based on the user identity corresponding to the first symbol, a bandwidth for transmitting the second electric wave, and input the selected bandwidth into the filter 223. For example, the bandwidth selector 222 may determine, based on a user identity A corresponding to the first symbol and the preset rule, that a bandwidth B for transmitting the second electric wave is 1 MHz from 60.0005 GHz to 60.0015 GHz. The bandwidth selector 222 inputs the selected bandwidth B into the filter 223. It may also be understood as that the bandwidth selector 222 may configure a filtering parameter for the filter 223, so that a carrier center frequency and the bandwidth that are used by a user corresponding to the user identity A to transmit the second electric wave are respectively 60.001 GHz and 1 MHz.

The filter 223 is a device that allows a wave in a specific frequency band to pass and shields another frequency band simultaneously. For example, the filter 223 allows the second electric wave corresponding to the selected user corresponding to the identity A to pass and shields a frequency band of another user simultaneously. For example, with reference to the foregoing example of the frequency selector 221 and the bandwidth selector 222, that the filter 223 may be configured to perform filtering processing on the received third signal is specifically as follows: The filter 223 filters out an unnecessary signal whose frequency is 59.999 GHz, and reserves a required signal whose frequency is 60.001 GHz. It may also be understood as that it is determined that the carrier center frequency and the bandwidth for transmitting the second electric wave are respectively 60.001 GHz and 1 MHz.

In a possible implementation, different frequencies may be respectively selected for different user identities, so that electric waves sent by different users do not interfere with each other, and the different users may send the second electric wave by using same or different bandwidths.

2. Transmitting Antenna 21

FIG. 2c is an example schematic architectural diagram of still another communications apparatus according to this application. As shown in FIG. 2c, the communications apparatus includes a direction vector modulator 20, a transmitting antenna 21, and a frequency domain resource selector 22. The transmitting antenna 21 includes a polarized transmitting antenna selector 211 and M polarized transmitting antennas 212. The M polarized transmitting antennas 212 have different polarization directions. For the direction vector modulator 20 and the frequency domain resource selector 22, refer to the descriptions in FIG. 2 to FIG. 2b. Details are not described herein again.

The polarized transmitting antenna selector 211 is configured to determine, based on a sequence number i that is of a direction vector of a first electric wave and that is from the direction vector modulator 20, a polarized transmitting antenna for transmitting a second electric wave, where the polarization transmitting antenna for transmitting the second electric wave is one of the M polarized transmitting antennas. The second electric wave is transmitted by using the determined polarized transmitting antenna 212.

In a possible implementation, the M polarized transmitting antennas may correspond one-to-one to M direction vectors of the first electric wave. For example, Table 2 shows a mapping relationship between sequence numbers of polarized transmitting antennas and sequence numbers of direction vectors of the first electric wave according to this application.

TABLE 2

Mapping relationship between the sequence numbers of the direction vectors of the first electric wave and the sequence numbers of the polarized transmitting antennas

| Sequence numbers i | 1 | 2 | 3 | 4 |
|---|---|---|---|---|
| Sequence numbers j of the polarized transmitting antennas | 1 | 2 | 3 | 4 |

As shown in Table 2, the sequence numbers i of the direction vectors of the first electric wave correspond one-to-one to the sequence numbers j of the polarized transmitting antennas. As shown in Table 2, a first polarized transmitting antenna is configured to transmit a second electric wave modulated to the first direction vector of the first electric wave, a second polarized transmitting antenna is configured to transmit a second electric wave modulated to the second direction vector of the first electric wave, the third polarized transmitting antenna is configured to transmit a second electric wave modulated to the third direction vector of the first electric wave, and the fourth polarized transmitting antenna is configured to transmit a second electric wave modulated to the fourth direction vector of the first electric wave.

With reference to the foregoing Table 1 and Table 2, the first electric wave supports the M direction vectors, the first symbol may be modulated to the $i^{th}$ direction vector ↑, of the first electric wave based on Table 1. It may be determined, based on Table 2, that the polarized transmitting antenna for transmitting the second electric wave is an $i^{th}$ polarized transmitting antenna. The second electric wave is transmitted by using the $i^{th}$ polarized transmitting antenna. For example, if the first symbol is 00, it is determined, by using Table 1, that the first symbol 00 may be modulated to the first direction vector of the first electric wave to obtain the first second electric wave, and it may be determined, by using Table 2, that the first polarized transmitting antenna is used to transmit the first second electric wave. The rest can be deduced by analogy.

As shown in FIG. 2c, the transmitting antenna 21 in the communications apparatus may further include a matching network. The matching network is configured to perform impedance matching on the polarized transmitting antennas 212, adjust load power of the polarized transmitting antennas 212, and suppress signal reflection.

FIG. 3 is an example schematic architectural diagram of another communications apparatus according to this application. As shown in FIG. 3, the communications apparatus includes a receiving antenna 31, an electric wave energy quantum converter 32, and an energy quantum detector 33. The receiving antenna 31 is configured to receive a second electric wave. The electric wave energy quantum converter 32 is configured to convert the second electric wave from the receiving antenna 31 into N energy quantum sets. The energy quantum detector 33 is configured to: determine a first distribution result of the N energy quantum sets from the electric wave energy quantum converter 32, determine, based on the first distribution result, that the second electric wave corresponds to an $i^{th}$ direction vector of a first electric wave, and determine a first symbol based on the $i^{th}$ direction vector of the first electric wave and a preset mapping relationship.

The received second electric wave is obtained by modulating the first symbol to one of M direction vectors of the first electric wave based on the preset mapping relationship. For this process, refer to the descriptions of the direction vector modulator 20 in FIG. 2.

Herein, the first symbol is a symbol corresponding to first data. The $i^{th}$ direction vector is one of the M direction vectors of the first electric wave. One energy quantum set is an empty set or includes at least one energy quantum. i is an integer. M is a positive integer.

In a possible implementation, energy conservation is satisfied between an electric wave and an energy quantum. The electric wave energy quantum converter 32 may be configured to convert the second electric wave into the N energy quantum sets based on an energy conversion relationship between the electric wave and the energy quantum.

Further, duration of receiving one symbol may be pre-stored in the communications apparatus. The duration of receiving one symbol is divided into N time windows (which may also be referred to as N time domains). Duration of each time window is T. For a $k^{th}$ time window in the N time windows, the second electric wave is converted into an energy quantum set based on the energy conversion relationship between the electric wave and the energy quantum, where k takes each value from 1 to N (that is, conversion between the second electric wave and an energy quantum is performed once in a time window), so that the N energy quantum sets may be obtained.

For example, the energy conversion relationship between the electric wave and the energy quantum may be shown in Formula 2. It may also be understood as that the second electric wave may be converted into an energy quantum set by using Formula 2.

$$\int_0^T s(t)^2 dt \underset{E_0}{\Longrightarrow} \delta Q F_v \qquad \text{Formula 2}$$

s(t) represents the second electric wave, $\delta$ represents a conversion loss factor, $0 \leq \delta \leq 1$, T represents duration of a time window, Q represents a quantity of energy quanta in the energy quantum set, Q is an integer, $F_v = hv$, and represents a value of energy of an energy quantum, and $E_0$ is basic excitation energy required in a conversion process.

The energy quantum set may also be an empty set. That is, there is no energy quantum in the energy quantum set.

Based on this solution, when strength of the second electric wave received by the communications apparatus is relatively weak, and even a waveform of the second electric wave cannot be restored, the second electric wave is converted into the N energy quantum sets, and statistics about the first distribution result of the N energy quantum sets are collected, so that the $i^{th}$ direction vector that is of the first electric wave and that corresponds to the second electric wave is determined. That is, the first symbol corresponding to the $i^{th}$ direction vector may be determined based on the preset mapping relationship, so that the first data can be determined. In this way, the first symbol carried on the second electric wave whose energy is relatively weak is determined, thereby helping improve sensitivity of receiving a signal by the communications apparatus.

The following separately describes in detail the function modules shown in FIG. 3, to provide an example of a specific implementation solution.

1. Energy Quantum Detector 33

Figure 3A:
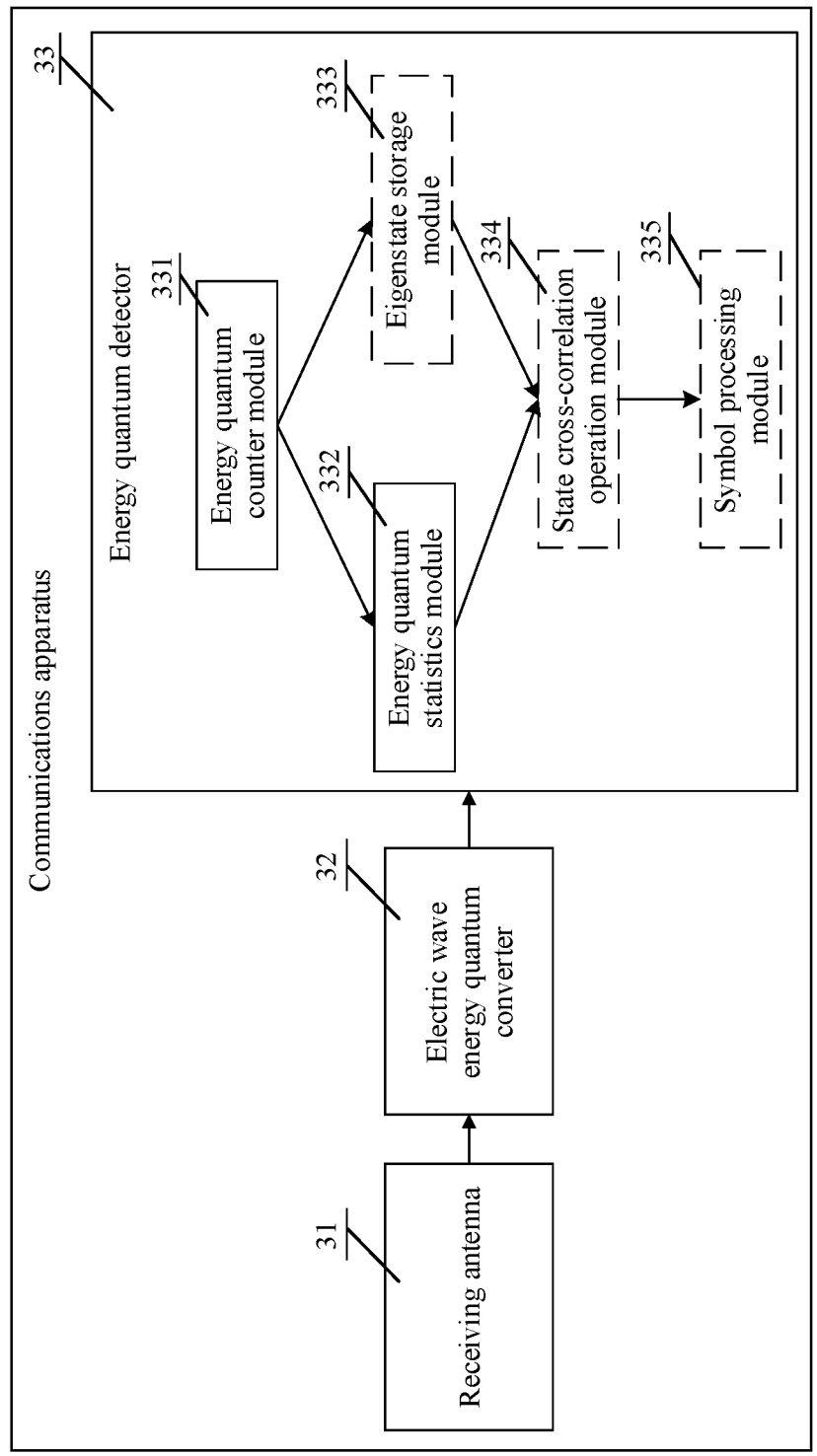
FIG. 3a is a schematic architectural diagram of another communications apparatus according to this application.

FIG. 3a is a schematic architectural diagram of another communications apparatus according to this application. The communications apparatus includes a receiving antenna 31, an electric wave energy quantum converter 32, and an energy quantum detector 33. The energy quantum detector 33 may include an energy quantum counter module 331 and an energy quantum statistics module 332. For the receiving antenna 31 and the electric wave energy quantum converter 32, refer to the descriptions in FIG. 3. Details are not described herein again.

The energy quantum counter module 331 is configured to determine a quantity of energy quanta in each of N energy quantum sets from the electric wave energy quantum converter 32. In a possible implementation, the electric wave energy quantum converter 32 transmits the N energy quantum sets to the energy quantum detector, and the energy quantum counter module 331 may separately determine the quantity of energy quanta in each of the N energy quantum sets according to Formula 2 above.

The energy quantum statistics module 332 is configured to obtain N second distribution results based on the quantity that is of energy quanta corresponding to each of the N energy quantum sets and that is from the energy quantum counter module 331, and collect statistics about the N second distribution results, to obtain a first distribution result, where one energy quantum set corresponds to one second distribution result.

For example, the second distribution result may be a relationship between a quantity of energy quanta in an energy quantum set and time. For example, N time windows correspond to the N energy quantum sets, and one energy quantum set corresponds to a quantity of energy quanta. That is, the second distribution results may be $(Q_k, T_k)$. A time sequence vector may include the second distribution results $(Q_k, T_k)$ according to a time sequence, to obtain the first distribution result $p(s) = [Q_1, Q_2, \ldots, Q_k, \ldots, Q_N]$.

As shown in FIG. 3a, the energy quantum detector 33 may further include a state cross-correlation operation module 334. Optionally, the energy quantum detector 33 may further include an eigenstate storage module 333 and a symbol processing module 335.

The eigenstate storage module 333 is configured to store M eigenstates $q_i$, where i takes each value from 1 to M, and M direction vectors of a first electric wave correspond one-to-one to the M eigenstates $q_i$. In a possible implementation, the eigenstate may be distribution results of the N energy quantum sets corresponding to an electric wave that carries no symbol in an ideal environment, and separately collecting statistics about distribution results of the N energy quantum sets. For example, the eigenstate $q_i$ is a distribution result of the N energy quantum sets that is obtained when no symbol is carried on an $i^{th}$ direction vector of the first electric wave. The ideal environment can be a microwave anechoic chamber and an environment in which there is no obstacle between a receiving antenna and a transmitting antenna, and the two antennas are relatively close to each other, and are aligned. For example, the eigenstate $q_i$ may alternatively be a time sequence vector $q_i=[Q_{i-1}, Q_{i-2}, \ldots, Q_{i-k} \ldots, Q_{i-N}]$.

The state cross-correlation operation module 334 is configured to determine, based on the first distribution result from the energy quantum statistics module 332 and the M eigenstates $q_i$ from the eigenstate storage module 333, that a second electric wave corresponds to the $i^{th}$ direction vector of the first electric wave. In a possible implementation, the state cross-correlation operation module 334 may obtain M convolutional peak values $\hat{s}_1$ according to $\hat{s}_1 = \text{argmax}_i p(s)*q_i$; and determine that an i value corresponding to a largest value in the M convolutional peak values $\hat{s}_1$ is a sequence number i of a direction vector of the first electric wave, where the direction vector that is of the first electric wave and whose sequence number is i is the $i^{th}$ direction vector of the first electric wave, p(s) is the first distribution result, and may be $p(s)=[Q_1, Q_2, \ldots, Q_k \ldots, Q_N]$, * represents mathematical convolution operation. The M eigenstates are used as a reference, so that a direction vector, corresponding to a first symbol modulated at a transmit end, of the first electric wave can be accurately determined, thereby helping accurately determine the first symbol.

It should be noted that the largest $\hat{s}_1$ may indicate that p(s) is most related to $q_i$. Therefore, it may be determined that the second electric wave is obtained by modulating the first symbol to the $i^{th}$ direction vector of the first electric wave.

The symbol processing module 335 is configured to determine the first symbol based on the sequence number i that is of the direction vector of the first electric wave and that is from the state cross-correlation operation module 334 and a preset mapping relationship. With reference to Table 1 above, the symbol processing module 335 may determine that the corresponding first symbol is 00 if the sequence number i that is of the direction vector of the first electric wave and that is received from the state cross-correlation operation module 334 is 1, may determine that the corresponding first symbol is 01 if the received sequence number i of the direction vector of the first electric wave is 2, may determine that the corresponding first symbol is 10 if the received sequence number i of the direction vector of the first electric wave is 3, or may determine that the corresponding first symbol is 11 if the received sequence number i of the direction vector of the first electric wave is 4, and may integrate the obtained first symbol according to a preset rule to obtain corresponding first data.

2. Electric Wave Energy Quantum Converter 32

Figure 3B:
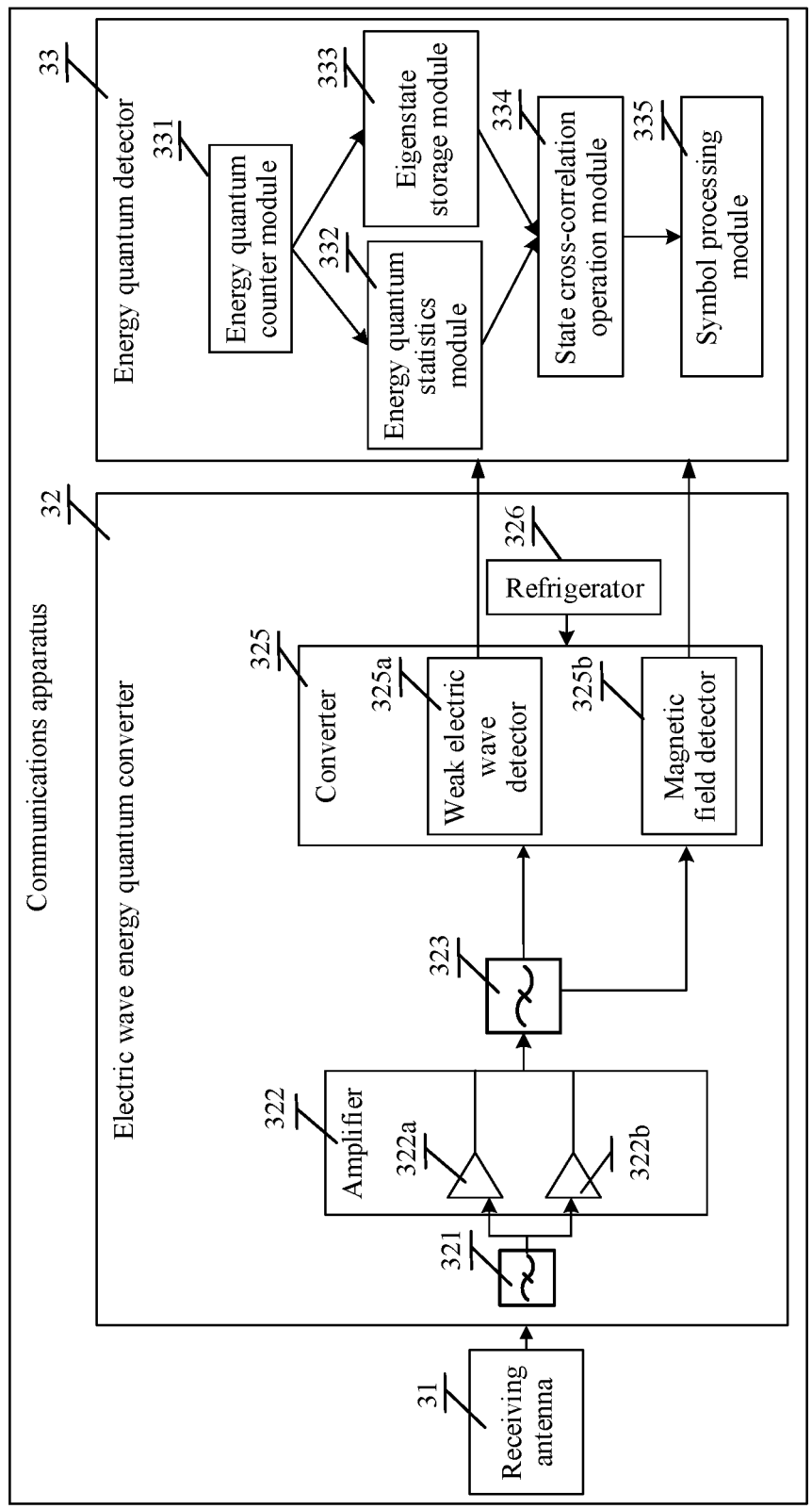
FIG. 3b is a schematic architectural diagram of still another communications apparatus according to this application.
Figures 1, 3C:
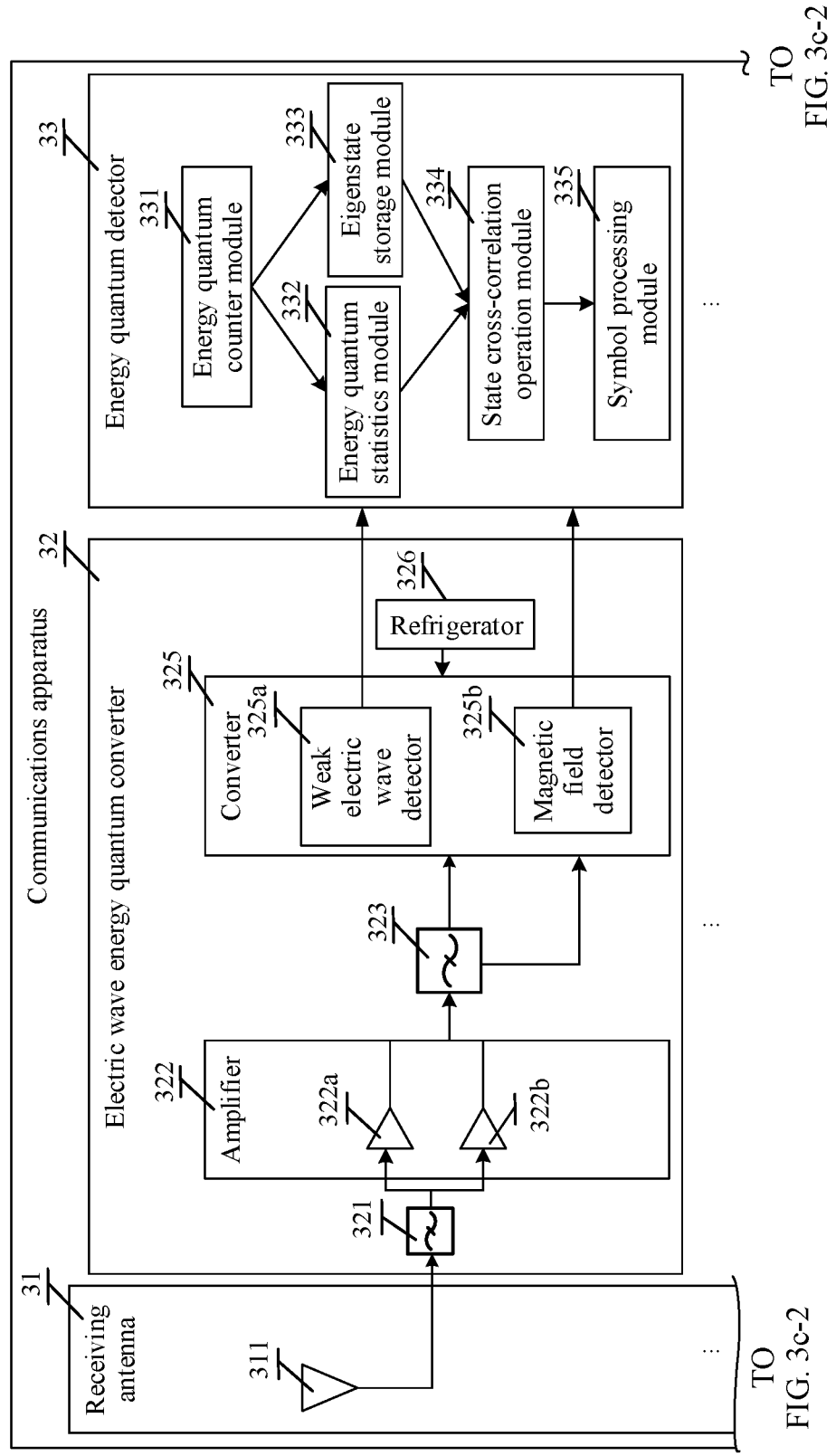
Figures 2, 3C:
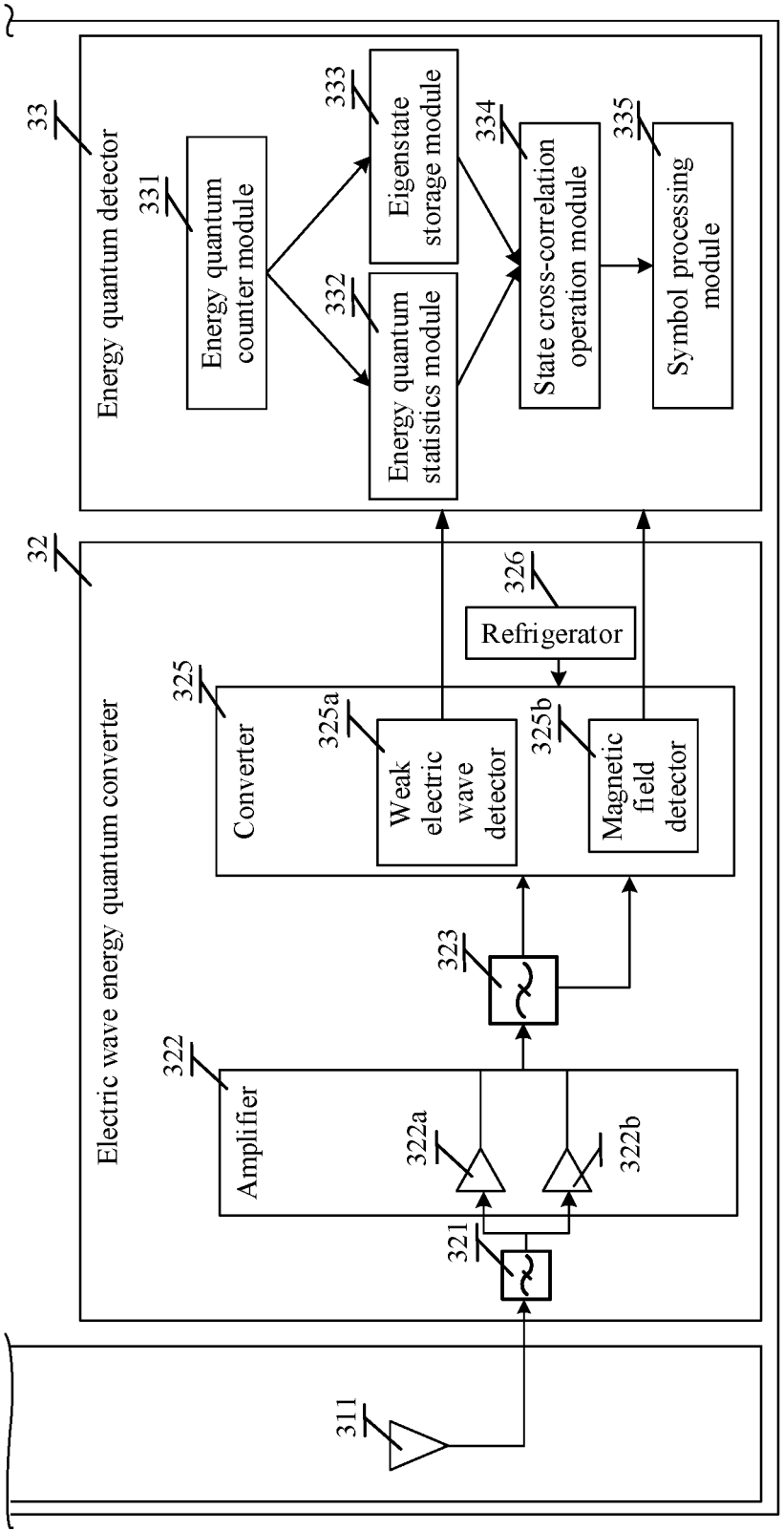

FIG. 3b is an example schematic architectural diagram of still another communications apparatus according to this application. As shown in FIG. 3b, the communications apparatus includes a receiving antenna 31, an electric wave energy quantum converter 32, and an energy quantum detector 33. The electric wave energy quantum converter 32 may include an amplifier 322 and a converter 325. Optionally, the electric wave energy quantum converter may further include a filter 321, a filter 323, and a refrigerator 326. For the receiving antenna 31, refer to the descriptions in FIG. 3. For the energy quantum detector 33, refer to the descriptions in FIG. 3 or FIG. 3a. Details are not described herein again.

The filter 321 is configured to filter a second electric wave received from the receiving antenna 31. Optionally, the filter 321 may filter out an out-of-band signal brought by the receiving antenna 31 and an ambient environment. It may also be understood as that noise brought by the receiving antenna 31 and an external environment is filtered out.

The amplifier 322 is configured to amplify the second electric wave from the filter 321. The amplifier 322 may amplify a weak signal, and interference of noise of the amplifier 322 to a useful signal is relatively small. That is, a signal-to-noise ratio of the amplifier 322 is relatively high. In a possible implementation, the amplifier 322 may be a traveling wave maser 322a and/or a heterojunction field effect transistor low noise amplifier 322b. The heterojunction field effect transistor low noise amplifier 322b is an amplifier with a quite low noise factor, and may be used as a high-frequency or middle-frequency preamplifier at a radio receive end.

The filter 323 is configured to filter out an out-of-band signal brought by the amplifier 322. It may also be understood as filtering out noise brought by the amplifier 322.

The converter 325 is configured to convert a received baseband signal into N energy quantum sets based on an energy conversion relationship between an electric wave and an energy quantum. In a possible implementation, the converter 325 may be a weak electric wave detector 325a and/or a magnetic field detector 325b. The weak electric wave detector 325a may be a Josephson junction weak electric wave detector, a superconducting SIS mixer, or the like.

The refrigerator 326 is configured to refrigerate the electric wave energy quantum converter 32. For example, the weak electric wave detector 325a and/or the magnetic field detector 325b in the converter 325 may be refrigerated. Refrigerating is performed on the electric wave energy quantum converter 32 by using the refrigerator 326, so that background thermal noise can be removed, thereby helping improve accuracy of a statistical result of a quantity of energy quanta in an energy quantum set.

3. Receiving Antenna 31

FIG. 3c-1 and FIG. 3c-2 are an example schematic architectural diagram of another communications apparatus according to this application. As shown in FIG. 3c-1 and FIG. 3c-2, the communications apparatus includes a receiving antenna 31, an electric wave energy quantum converter 32, and an energy quantum detector 33. The receiving antenna 31 may include M polarized receiving antennas 311. The M polarized receiving antennas 311 have different polarization directions, and may be configured to separately receive a second electric wave. For the electric wave energy quantum converter 32 and the energy quantum detector 33, refer to the descriptions in FIG. 3 to FIG. 3b. Details are not described herein again.

In a possible implementation, that a polarization direction of the polarized receiving antenna 311 is closer to a polarization direction of a polarized transmitting antenna 212 indicates larger energy of the received second electric wave. For example, a polarization direction of an $i^{th}$ polarized transmitting antenna 212 is the same as a polarization direction of an $i^{th}$ polarized receiving antenna 311. When the $i^{th}$ polarized transmitting antenna 212 transmits a second electric wave, energy of the second electric wave received by the $i^{th}$ polarized receiving antenna 311 is stronger than energy of the second electric wave received by another polarized receiving antenna. In this way, the polarization direction of the polarized receiving antenna 311 may be aligned with the polarization direction of the corresponding polarized transmitting antenna 212, thereby helping improve strength of energy of a transmitted electric wave.

As shown in FIG. 3c-1 and FIG. 3c-2, one polarized receiving antenna 311 corresponds to one electric wave energy quantum converter 32 and one energy quantum detector 33. The polarized receiving antenna 311 may separately transmit a received second electric wave to the corresponding electric wave energy quantum converter 32. For a processing manner after the polarized receiving antenna 311 transmits the second electric wave to the electric wave energy quantum converter 32, refer to the descriptions in FIG. 3 to FIG. 3b. Details are not described herein again.

Figure 4:
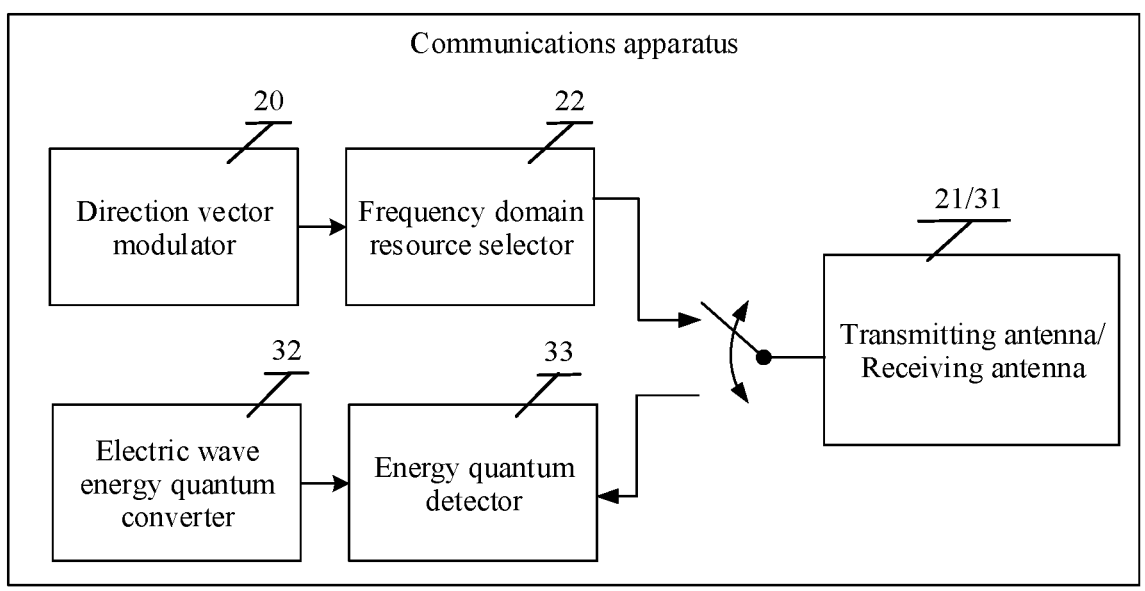
FIG. 4 is a schematic architectural diagram of another communications apparatus according to this application.

FIG. 4 is a schematic architectural diagram of another communications apparatus according to this application. The communications apparatus may include the communications apparatus in any one of FIG. 2 to FIG. 2c and the communications apparatus in any one of FIG. 3 to FIG. 3c-2. It may also be understood as that, in the communications apparatus shown in FIG. 4, the communications apparatus in any one of FIG. 2 to FIG. 2c may be used as a transmit end, and the communications apparatus in any one of FIG. 3 to FIG. 3c-2 may be used as a receive end.

As shown in FIG. 4, a transmitting antenna 21 and a receiving antenna 31 may be a same antenna (namely, a shared antenna), and a transmit link or a receive link may be selected by using a control switch. When the antenna is used as a transmitting antenna, refer to the descriptions of the transmitting antenna 21 in FIG. 2 to FIG. 2c. When the antenna is used as a receiving antenna, refer to the descriptions of the receiving antenna 31 in FIG. 3 to FIG. 3c-2. Details are not described herein again.

Based on the communications apparatus shown in FIG. 4, on one hand, the communications apparatus used as the transmit end may modulate a symbol corresponding to first data to a direction vector of a first electric wave, to increase a dimension in which the first data is modulated to the first electric wave, thereby improving a data transmission capability of the communications apparatus; on the other hand, the communications apparatus used as the receive end may convert the second electric wave into an energy quantum set, to obtain, through demodulation when energy of the second electric wave is relatively weak, a first symbol carried on the second electric wave, thereby improving sensitivity of receiving a signal by a communications apparatus in a wireless communications system.

For example, any communications apparatus in FIG. 2 to FIG. 2c and any communications apparatus in FIG. 3 to FIG. 3c-2 may be integrated into one communications apparatus. For example, the communications apparatuses are both integrated into a terminal. Any communications apparatus in FIG. 2 to FIG. 2c is a transmit end of the terminal, and any communications apparatus in FIG. 3 to FIG. 3c-2 is a receive end of the terminal. For another example, the communications apparatuses are both integrated into a base station. Any communications apparatus in FIG. 2 to FIG. 2c is a transmit end of the base station, and any communications apparatus in FIG. 3 to FIG. 3c-2 is a receive end of the base station. For another example, the communications apparatuses are both integrated into a satellite. To be specific, any communications apparatus in FIG. 2 to FIG. 2c is a transmit end of the satellite, and any communications apparatus in FIG. 3 to FIG. 3c-2 is a receive end of the satellite.

Figure 5:
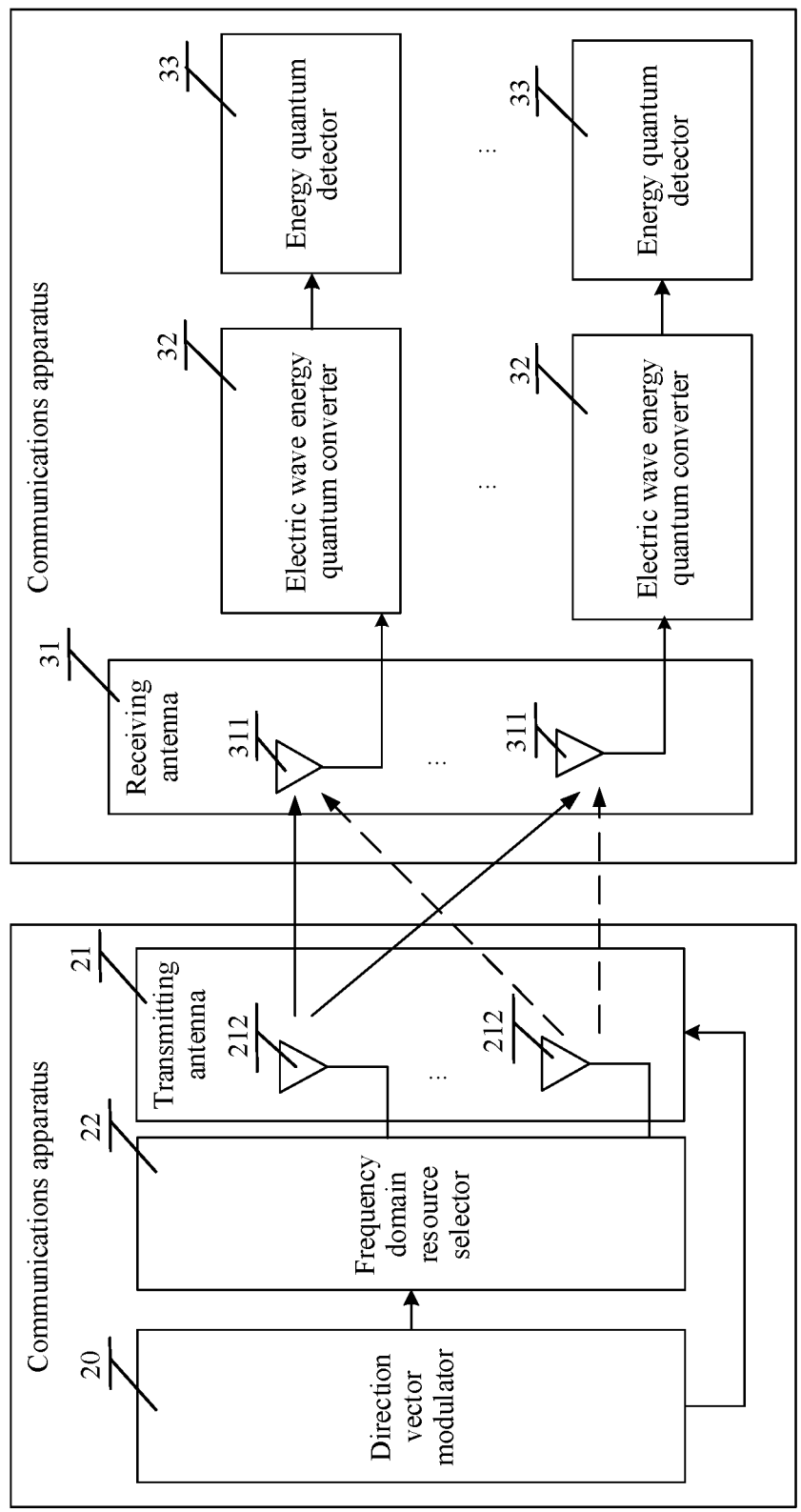
FIG. 5 is a schematic architectural diagram of another communications system according to this application.
Figure 6:
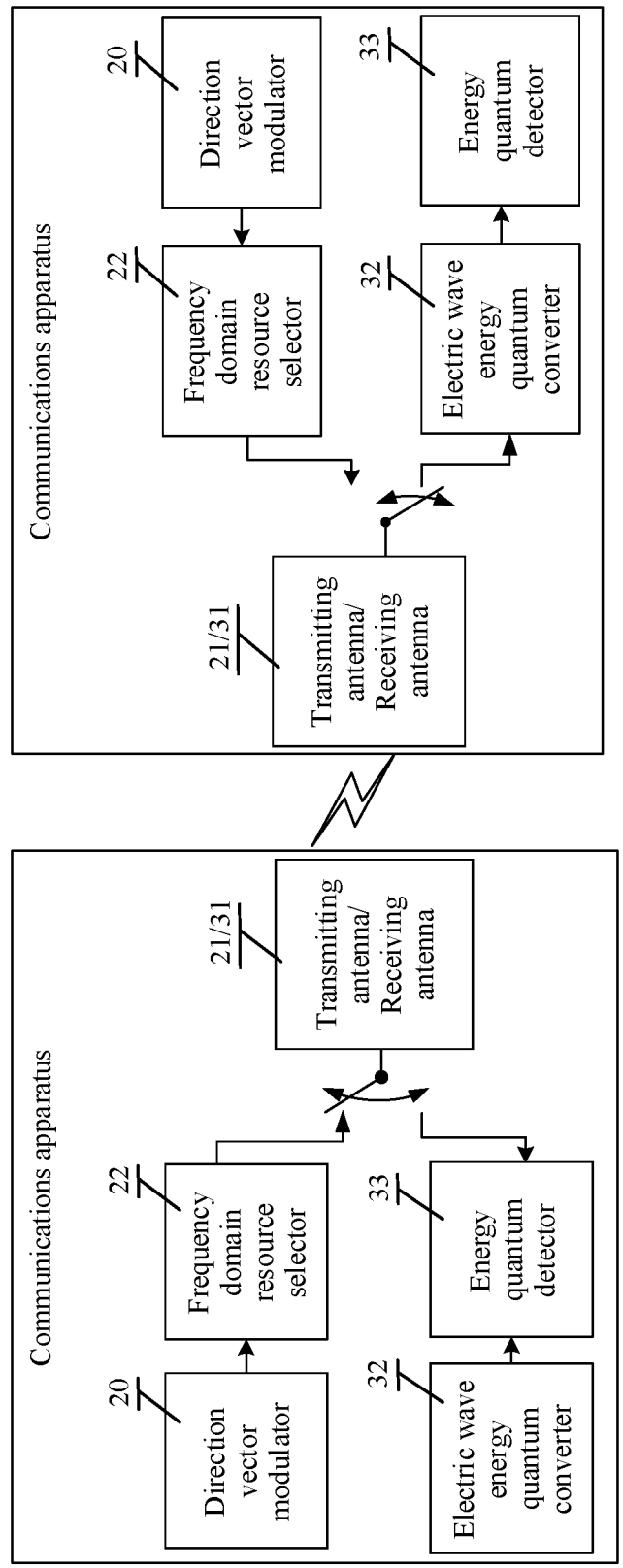
FIG. 6 is a schematic architectural diagram of another communications system according to this application.

FIG. 5 and FIG. 6 are schematic architectural diagrams of different communications system according to this application. The communications systems shown in FIG. 5 and FIG. 6 each may be the communications system shown in FIG. 1, may be the communications system shown in FIG. 1a, or may be the communications system shown in FIG. 1b. Descriptions are separately provided below.

FIG. 5 is a schematic architectural diagram of another communications system according to this application. The communications system may include the communications apparatus shown in FIG. 2c and the communications apparatus shown in FIG. 3c-1 and FIG. 3c-2. In the communications system, the communications apparatus shown in FIG. 2c may be used as a transmitting apparatus, and the communications apparatus shown in FIG. 3c-1 and FIG. 3c-2 may be used as a receiving apparatus. One of the M polarized transmitting antennas 212 in the communications apparatus shown in FIG. 2c transmits a second electric wave, and each of the M polarized receiving antennas 311 in the communications apparatus shown in FIG. 3c-1 and FIG. 3c-2 may receive the second electric wave. The polarized receiving antennas 311 may respectively transmit received second electric waves to corresponding electric wave energy quantum converters 32. For both a processing manner after the electric wave energy quantum converters 32 receive the second electric waves and a processing manner of energy quantum detectors 33, refer to the descriptions in FIG. 3 to FIG. 3c-2. Details are not described herein again.

FIG. 6 is a schematic architectural diagram of still another communications system according to this application. The communications system may include at least two communications apparatuses shown in FIG. 4. For descriptions of the communications apparatuses in the communications system, refer to the descriptions of the communications apparatus in FIG. 4. Details are not described herein again.

Based on the communications system shown in FIG. 5 or FIG. 6, a symbol corresponding to first data is modulated to a direction vector of a first electric wave, to increase a dimension in which the first data is modulated to the first electric wave, thereby improving a data transmission capability of the wireless communications system. Further, the second electric wave is converted into an energy quantum set, to obtain, through demodulation when energy of the second electric wave is relatively weak, a first symbol carried on the second electric wave, thereby providing sensitivity of receiving a signal in the wireless communications system.

Figure 7:
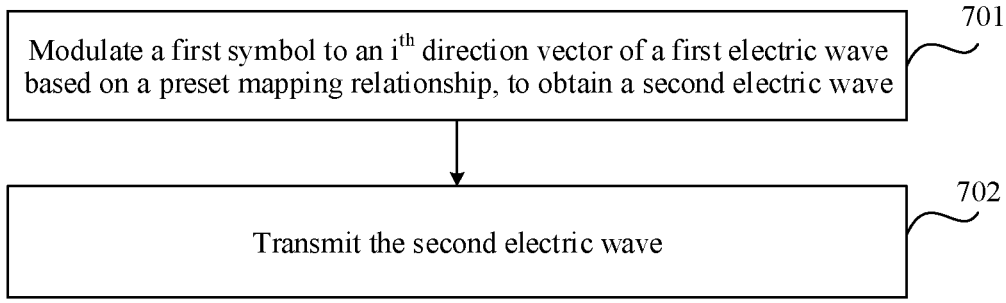
FIG. 7 is a schematic flowchart of a quantum communication method according to this application.

FIG. 7 is an example schematic flowchart of a quantum communication method according to this application. The communication method may be performed by any one of the communications apparatuses shown in FIG. 2 to FIG. 2c. The method includes the following steps.

Step 701: Modulate a first symbol to an $i^{th}$ direction vector of a first electric wave based on a preset mapping relationship, to obtain a second electric wave.

The first symbol is a symbol corresponding to first data, the first electric wave supports M direction vectors, the $i^{th}$ direction vector of the first electric wave is one of the M direction vectors of the first electric wave, the $i^{th}$ direction vector of the first electric wave corresponds to an $i^{th}$ distribution result, the $i^{th}$ distribution result is obtained by converting the second electric wave into an energy quantum, M is a positive integer, and i is an integer.

In a possible implementation, a sequence number i of a direction vector that is of the first electric wave and that corresponds to the first symbol may be determined based on the preset mapping relationship; and the first symbol may be modulated to the $i^{th}$ direction vector of the first electric wave, to obtain the second electric wave, where the direction vector that is of the first electric wave and whose sequence number is i is the $i^{th}$ direction vector of the first electric wave.

Step 701 may be performed by the direction vector modulator 20 in the communications apparatuses shown in FIG. 2 to FIG. 2c. For a detailed process, refer to the descriptions in FIG. 2 to FIG. 2c. Details are not described herein again.

Step 702: Transmit the second electric wave.

Step 702 may be performed by the transmitting antenna 21 in the communications apparatuses shown in FIG. 2 to FIG. 2c. Refer to the descriptions of the transmitting antenna 21. Details are not described herein again.

In a possible implementation, a frequency and a bandwidth for transmitting the second electric wave may be determined based on the sequence number i of the direction vector of the first electric wave. The frequency and the bandwidth for transmitting the second electric wave may be determined by the frequency domain resource selector 22 in the communications apparatuses shown in FIG. 2 to FIG. 2c. For a specific process, refer to the descriptions of the frequency domain resource selector 22. Details are not described herein again.

Further, the second electric wave may be transmitted based on the frequency and the bandwidth for transmitting the second electric wave.

In a possible implementation, the transmitting antenna may include M polarized transmitting antennas. A polarized transmitting antenna for transmitting the second electric wave may be first determined based on the sequence number i of the direction vector of the first electric wave, and then the second electric wave is transmitted by using the determined polarized transmitting antenna. For details, refer to the foregoing descriptions of the transmitting antenna 21.

It can be learned from the foregoing step 701 and step 702 that, compared with the conventional technology in which a symbol is modulated to parametric values: a phase, an amplitude, and a frequency of a carrier, in this solution in this application, the first symbol may be modulated to a direction vector of the first electric wave, to increase a dimension in which the symbol is modulated to an electric wave, thereby helping satisfy increasing requirements of wireless transmission. Further, in this solution, the symbol is modulated to the direction vector of the first electric wave, and a manner, to be specific, modulating the symbol to the phase, the amplitude, and the frequency, in the conventional technology is not changed. Therefore, this solution is compatible with the dimensions to which the symbol can be modulated in the conventional technology.

It should be noted that, for another possible implementation in the method, refer to the foregoing descriptions. Details are not described herein again.

Figure 8:
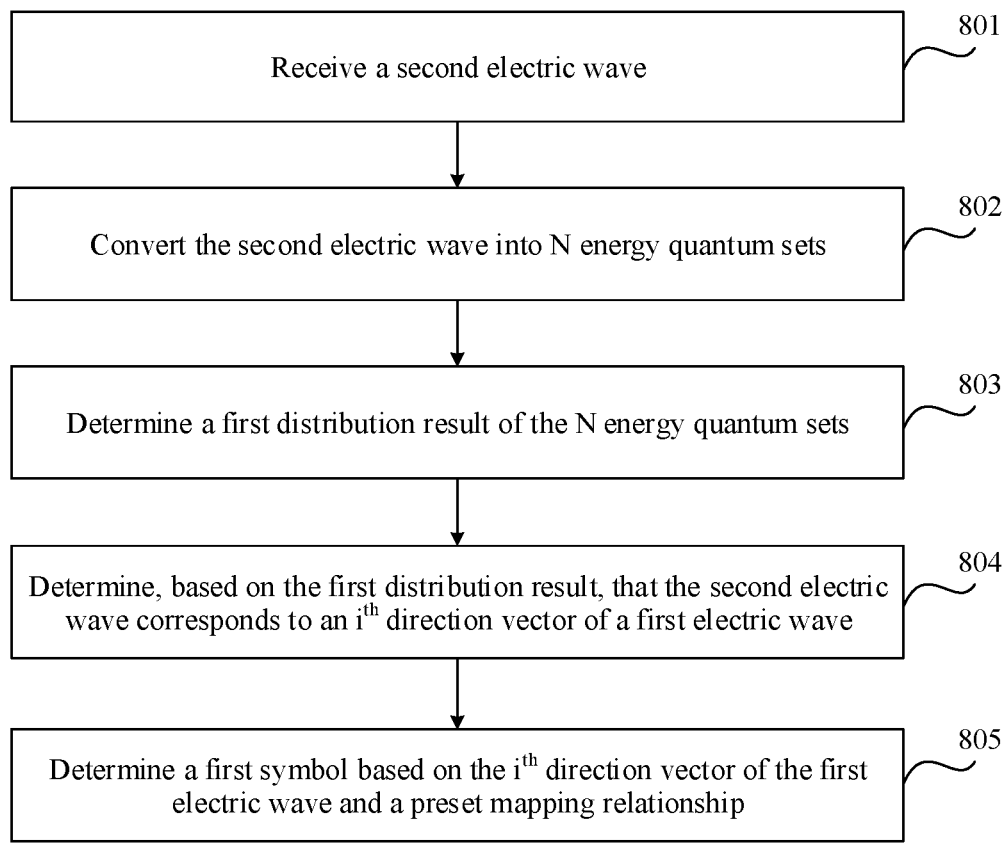
FIG. 8 is a schematic flowchart of another quantum communication method according to this application.

FIG. 8 is a schematic flowchart of another quantum communication method according to this application. The communication method may be performed by any one of the communications apparatuses shown in FIG. 3 to FIG. 3c-2. The method includes the following steps.

Step 801: Receive a second electric wave.

The second electric wave is obtained by modulating a first symbol to one of M direction vectors of a first electric wave based on a preset mapping relationship, and the first symbol is a symbol corresponding to first data.

Step 801 may be performed by the receiving antenna 31 in FIG. 3 to FIG. 3c-2. For a possible implementation, refer to the descriptions of the receiving antenna 31. Details are not described herein again.

Step 802: Convert the second electric wave into N energy quantum sets.

One energy quantum set is an empty set or includes at least one energy quantum, and N is a positive integer.

In a possible implementation, the second electric wave may be converted into the N energy quantum sets based on an energy conversion relationship between an electric wave and an energy quantum. Specifically, for a $k^{th}$ time window in N time windows, the second electric wave may be converted into one energy quantum set, where k takes each value from 1 to N, to obtain N energy quantum sets, and an accumulated value of the N time windows is duration of transmitting the first symbol.

To reduce background thermal noise and improve accuracy of collecting statistics about a quantity of converted energy quanta, the second electric wave may be converted into the N energy quantum sets when a temperature of an environment in which the second electric wave is located is lower than a temperature threshold.

Step 802 and the possible implementation may be performed by the energy quantum converter 32 in any one of FIG. 3 to FIG. 3c-2. For a detailed process, refer to the descriptions of the energy quantum converter 32. Details are not described herein again.

Step 803: Determine a first distribution result of the N energy quantum sets.

In a possible implementation, a quantity of energy quanta in each of the N energy quantum sets may be determined. N second distribution results are obtained based on the N determined quantities of energy quanta. Statistics about the N second distribution results are collected, to obtain the first distribution result. One energy quantum set corresponds to one second distribution result.

Step 804: Determine, based on the first distribution result, that the second electric wave corresponds to an $i^{th}$ direction vector of the first electric wave The $i^{th}$ direction vector is one of the M direction vectors of the first electric wave, and i is an integer.

In a possible implementation, that the second electric wave corresponds to the $i^{th}$ direction vector of the first electric wave may be determined based on the first distribution result and M pre-stored eigenstates $q_i$, where the eigenstate $q_i$ is a distribution result of the N energy quantum sets that is obtained when the $i^{th}$ direction vector of the first electric wave carries no symbol, the M eigenstates $q_i$ correspond one-to-one to the M direction vectors of the first electric wave, M is a positive integer, and i takes each value from 1 to M.

Specifically, M convolutional peak values $\hat{s}_1$ may be obtained according to $\hat{s}_1 = \mathrm{argmax}_i \ p(s)^* q_i$; and that an i value corresponding to a largest value in the M convolutional peak values $\hat{s}_1$ is a sequence number i of a direction vector of the first electric wave may be determined, where the direction vector that is of the first electric wave and whose sequence number is i is the $i^{th}$ direction vector of the first electric wave, and p(s) is the first distribution result.

Step 805: Determine the first symbol based on the $i^{th}$ direction vector of the first electric wave and the preset mapping relationship.

Herein, there is a specific mapping relationship between the M direction vectors of the first electric wave and symbols of the first data. Refer to the foregoing descriptions in Table 1. Details are not described herein again.

The foregoing step 803 and step 804 and the possible implementations in the steps may all be performed by the energy quantum detector 33 in any one of FIG. 3 to FIG.

3c-2. For a detailed process, refer to the foregoing descriptions of the energy quantum detector 33. Details are not described herein again.

It can be learned from the foregoing step 801 to step 805 that, when strength of the received second electric wave is relatively weak (in other words, power of the second electric wave is relatively low), and even an analog waveform of the second electric wave cannot be detected, the second electric wave may be converted into the N energy quantum sets, and statistics about the first distribution result of the N energy quantum sets may be collected, so that the $i^{th}$ direction vector that is of the first electric wave and that corresponds to the second electric wave is determined. That is, the first symbol corresponding to the $i^{th}$ direction vector may be determined based on the preset mapping relationship, so that the first data can be determined. In this way, the first symbol carried on the second electric wave whose energy is relatively weak is determined. In this way, energy of a weak electric wave can be fully used to extract data carried on the electric wave, thereby helping improve signal receiving sensitivity.

Before step 802, in a possible implementation, the received second electric wave may be filtered, amplified, and/or demodulated. For a specific process, refer to the foregoing descriptions of the electric wave energy quantum converter 32. Details are not described herein again.

In a possible implementation, the energy quantum in any one of the foregoing embodiments may be a quantum (which may also be referred to as a photon quantum), a phonon, or a terahertz. The electric wave in any one of the foregoing embodiments may also be referred to as an electromagnetic wave.

Figure 9:
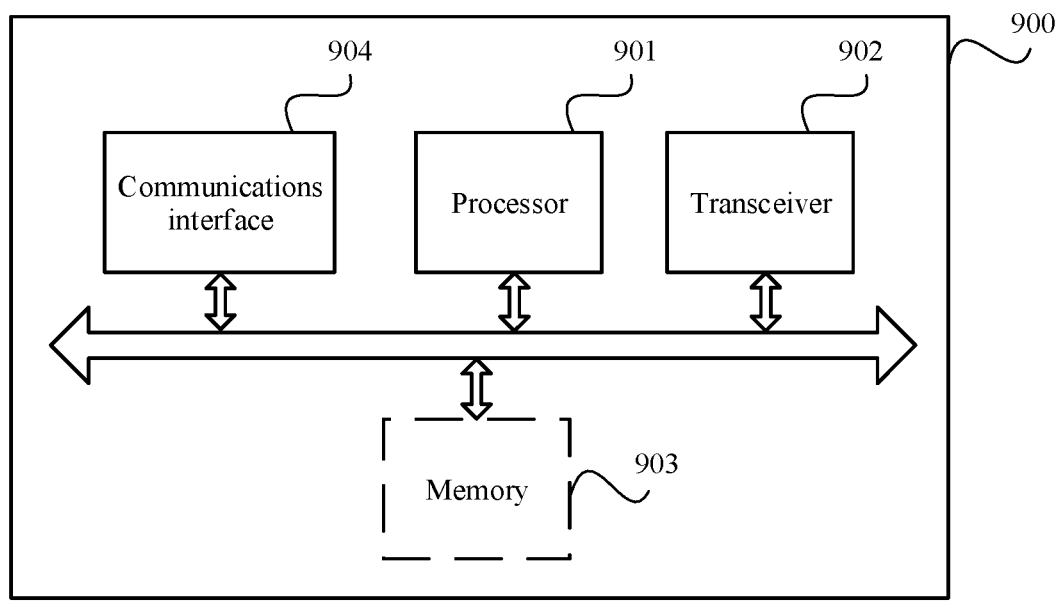
FIG. 9 is a schematic architectural diagram of a communications apparatus according to this application.

Based on the foregoing content and a same concept, this application provides a communications apparatus 900, configured to execute any solution in the foregoing methods. FIG. 9 is an example schematic structural diagram of a communications apparatus according to this application. As shown in FIG. 9, the communications apparatus 900 includes at least one processor 901, at least one transceiver 902, at least one memory 903, and a communications interface 904. The processor 901, the transceiver 902, the memory 903, and the communications interface 904 are connected to each other through a bus.

The memory 903 may include a volatile memory, for example, a random-access memory (RAM). Alternatively, the memory may include a non-volatile memory, for example, a flash memory, a hard disk drive (HDD), or a solid-state drive (SSD). Alternatively, the memory 903 may include a combination of the foregoing types of memories.

The communications interface 904 may be a wired communications interface, a wireless communications interface, or a combination thereof. The wired communications interface may be, for example, an ethernet interface. The ethernet interface may be an optical interface, an electrical interface, or a combination thereof. The wireless communications interface may be a WLAN interface.

The processor 901 may be a central processing unit (CPU), a network processor (NP), or a combination of a CPU and an NP. Alternatively, the processor 901 may be a hardware chip. The foregoing hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

Optionally, the memory 903 may be further configured to store a program instruction, and the processor 901 invokes the program instruction stored in the memory 903, to perform one or more steps or an optional implementation in the embodiments shown in the foregoing solutions, so that the communications apparatus 900 implements a function of the communications apparatuses in the foregoing methods.

In a possible implementation, the processor 901 and the memory 903 may be integrated together. Alternatively, the processor 901 and the memory 903 may be coupled by using an interface. Alternatively, the processor 901 is a hardware chip, and the memory 903 is outside the chip. This is not limited in this application.

In an application, the communications apparatus 900 may be the communications apparatus in any one of FIG. 2 to FIG. 2c, and may execute the solution correspondingly executed by the communications apparatus in FIG. 7. Alternatively, the communications apparatus 900 may be either of the communications apparatus 11 and the communications apparatus 12 in FIG. 1, may be either of the terminal device 11a and the satellite 12a shown in FIG. 1a, or may be either of the terminal device 11b and the base station 12b shown in FIG. 1b.

The processor 901 is configured to: execute the instruction stored in the memory, and control the transceiver 902 to receive a signal and send a signal. When the processor 901 executes the instruction stored in the memory, the processor 901 in the communications apparatus 900 is configured to modulate a first symbol to an $i^{th}$ direction vector of a first electric wave based on a preset mapping relationship, to obtain a second electric wave, where the first symbol is a symbol corresponding to first data, the first electric wave supports M direction vectors, the $i^{th}$ direction vector of the first electric wave is one of the M direction vectors of the first electric wave, the $i^{th}$ direction vector of the first electric wave corresponds to an $i^{th}$ distribution result, the $i^{th}$ distribution result is obtained by converting the second electric wave into an energy quantum, M is a positive integer, and i is an integer. The transceiver 902 is configured to transmit the second electric wave.

In another application, the communications apparatus 900 may be the communications apparatus in any one of FIG. 3 to FIG. 3c-2, and may execute the solution correspondingly executed by the communications apparatus in FIG. 8. Alternatively, the communications apparatus 900 may be either of the communications apparatus 11 and the communications apparatus 12 in FIG. 1, may be either of the terminal device 11a and the satellite 12a shown in FIG. 1a, or may be either of the terminal device 11b and the base station 12b shown in FIG. 1b.

The processor 901 is configured to: execute the instruction stored in the memory, and control the transceiver 902 to receive a second electric wave, where the second electric wave is obtained by modulating a first symbol to one of M direction vectors of a first electric wave based on a preset mapping relationship, the first symbol is a symbol corresponding to first data, and M is a positive integer. When executing the instruction stored in the memory, the processor 901 converts the second electric wave into N energy quantum sets, and determines a first distribution result of the N energy quantum sets; determines, based on the first distribution result, that the second electric wave corresponds to an $i^{th}$ direction vector of the first electric wave, where the $i^{th}$ direction vector is one of the M direction vectors of the first electric wave; and determines the first symbol based on the $i^{th}$ direction vector of the first electric wave and the preset mapping relationship, where i is an integer, an energy quantum set is an empty set or includes at least one energy quantum, and N is a positive integer.

It should be noted that, for specific beneficial effects of a quantum communication method that the communications apparatus shown in FIG. 9 can be configured to perform, refer to related descriptions in the foregoing method embodiments. Details are not described herein again. It may be understood that the processor 901 and the memory 903 may be integrated together. Alternatively, the processor 901 and the memory 903 may be coupled by using an interface. Alternatively, the processor 901 is a hardware chip, and the memory 903 is outside the chip. This is not limited in this application.

Figure 10:
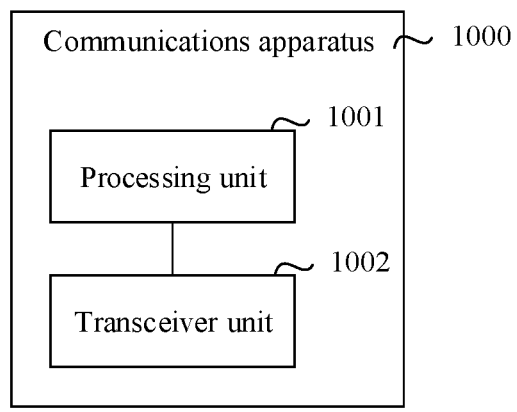
FIG. 10 is a schematic architectural diagram of a communications apparatus according to this application.

Based on the foregoing content and a same concept, this application provides a communications apparatus 1000, configured to execute any solution of the communications apparatuses in the foregoing methods. FIG. 10 is an example schematic structural diagram of a communications apparatus according to this application. As shown in FIG. 10, the communications apparatus 1000 includes a processing unit 1001 and a transceiver unit 1002.

In an application, the communications apparatus 1000 may be the communications apparatus in any one of FIG. 2 to FIG. 2c, and may execute the solution correspondingly executed by the communications apparatus in FIG. 7. Alternatively, the communications apparatus 1000 may be either of the communications apparatus 11 and the communications apparatus 12 in FIG. 1, may be either of the terminal device 11a and the satellite 12a shown in FIG. 1a, or may be either of the terminal device 11b and the base station 12b shown in FIG. 1b.

The processing unit 1001 is configured to modulate a first symbol to an $i^{th}$ direction vector of a first electric wave based on a preset mapping relationship, to obtain a second electric wave, where the first symbol is a symbol corresponding to first data, the first electric wave supports M direction vectors, the $i^{th}$ direction vector of the first electric wave is one of the M direction vectors of the first electric wave, the $i^{th}$ direction vector of the first electric wave corresponds to an $i^{th}$ distribution result, the $i^{th}$ distribution result is obtained by converting the second electric wave into an energy quantum, M is a positive integer, and i is an integer. The transceiver unit 1002 is configured to transmit the second electric wave.

In a second application, the communications apparatus 1000 may be the communications apparatus in any one of FIG. 3 to FIG. 3c-2, and may execute the solution correspondingly executed by the communications apparatus in FIG. 8. Alternatively, the communications apparatus 1000 may be either of the communications apparatus 11 and the communications apparatus 12 in FIG. 1, may be either of the terminal device 11a and the satellite 12a shown in FIG. 1a, or may be either of the terminal device 11b and the base station 12b shown in FIG. 1b.

The processing unit 1001 is configured to: execute an instruction stored in a memory, and control the transceiver unit 1002 to receive a second electric wave, where the second electric wave is obtained by modulating a first symbol to one of M direction vectors of a first electric wave based on a preset mapping relationship, the first symbol is a symbol corresponding to first data, and M is a positive integer. When executing the instruction stored in the memory, the processing unit 1001 converts the second electric wave into N energy quantum sets, and determines a first distribution result of the N energy quantum sets; determines, based on the first distribution result, that the second electric wave corresponds to an $i^{th}$ direction vector of the first electric wave, where the $i^{th}$ direction vector is one of the M direction vectors of the first electric wave; and determines the first symbol based on the $i^{th}$ direction vector of the first electric wave and the preset mapping relationship, where i is an integer, an energy quantum set is an empty set or includes at least one energy quantum, and N is a positive integer.

It should be understood that, division into the units of the communications apparatus is merely logic al function division, and during actual implementation, all or some of the units may be integrated into a physical entity, or the units may be physically separated. In this embodiment of this application, the processing unit 1001 in FIG. 10 may be implemented by the processor 901 in FIG. 9, and the transceiver unit 1002 may be implemented by the transceiver 902 in FIG. 9. In other words, in this embodiment of this application, the processing unit 1001 may perform the solution performed by the processor 901 in FIG. 9, and the transceiver unit 1002 may perform the solution performed by the transceiver 902 in FIG. 9. For remaining content, refer to the foregoing content. Details are not described herein again.

It should be noted that, for specific beneficial effects of a communication method that the communications apparatus shown in FIG. 10 can be configured to perform, refer to related descriptions in the foregoing method embodiments. Details are not described herein again. It may be understood that the units in this embodiment of this application may also be referred to as modules. The foregoing units or modules may exist independently, or may be integrated together.

All or some of the foregoing embodiments may be implemented by using software, hardware, or any combination thereof. When being implemented by using a software program, all or some of the embodiments may be implemented in a form of a computer program product. The computer program product includes one or more instructions. When the computer program instructions are loaded and executed on the computer, the procedure or functions according to the embodiments of this application are all or partially generated. The computer may be a general-purpose computer, a dedicated computer, a computer network, or other programmable apparatuses. The instructions may be stored in a computer storage medium or may be transmitted from a computer storage medium to another computer-readable storage medium. For example, the instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer storage medium may be any usable medium accessible by a computer, or a data storage device, such as a server or a data center, integrating one or more usable media. The usable medium may be a magnetic medium (for example, a floppy disk, a hard disk, a magnetic tape, or a magneto-optical disk (MO)), an optical medium (for example, a CD, a DVD, a BD, or an HVD), a semiconductor medium (for example, a ROM, an EPROM, an EEPROM, a non-volatile memory (NAND FLASH), or a solid-state drive (SSD)), or the like.

A person skilled in the art should understand that the embodiments of this application may be provided as a method, a system, or a computer program product. Therefore, the embodiments of this application may use a form of hardware only embodiments, software only embodiments, or embodiments with a combination of software and hardware. Moreover, the embodiments of this application may use a form of a computer program product that is implemented on one or more computer-usable storage media (including but not limited to a disk memory, a CD-ROM, an optical memory, and the like) that include computer-usable program code.

The embodiments of this application are described with reference to the flowcharts and/or block diagrams of the method, the device (system), and the computer program product according to the embodiments of this application. It should be understood that instructions may be used to implement each process and/or each block in the flowcharts and/or the block diagrams and a combination of a process and/or a block in the flowcharts and/or the block diagrams. These instructions may be provided for a general-purpose computer, a dedicated computer, an embedded processor, or a processor of another programmable data processing device to generate a machine, so that the instructions executed by a computer or a processor of another programmable data processing device generate an apparatus for implementing a specified function in one or more processes in the flowcharts and/or in one or more blocks in the block diagrams.

These computer program instructions may be stored in a computer readable memory that can instruct the computer or another programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

Obviously, a person skilled in the art can make various modifications and variations to the embodiments of this application without departing from the scope of this application. This application is intended to cover these modifications and variations provided that they fall within the scope of the claims and their equivalent technologies.

What is claimed is:

1. A quantum communication method, applied to a communications apparatus, the method comprising:
   modulating a first symbol to an $i^{th}$ direction vector of a first electric wave based on a preset mapping relationship, to obtain a second electric wave, wherein the first symbol is a symbol corresponding to first data, the first electric wave supports M direction vectors, the $i^{th}$ direction vector of the first electric wave is one of the M direction vectors of the first electric wave, the $i^{th}$ direction vector of the first electric wave corresponds to an $i^{th}$ distribution result, the $i^{th}$ distribution result is obtained by converting the second electric wave into an energy quantum, M is a positive integer, and i is an integer; and
   transmitting the second electric wave.

2. The method according to claim 1, wherein the modulating the first symbol to the $i^{th}$ direction vector of the first electric wave based on the preset mapping relationship comprises:
   determining, based on the preset mapping relationship, a sequence number i of a direction vector that is of the first electric wave and that corresponds to the first symbol, wherein the direction vector that is of the first electric wave and whose sequence number is i is the $i^{th}$ direction vector of the first electric wave; and
   modulating the first symbol to the $i^{th}$ direction vector of the first electric wave, to obtain the second electric wave.

3. The method according to claim 2, further comprising:
   determining, based on a user identity corresponding to the first symbol, a frequency and a bandwidth for transmitting the second electric wave; and
   transmitting the second electric wave based on the frequency and the bandwidth for transmitting the second electric wave.

4. The method according to claim 2, wherein the transmitting the second electric wave comprises:
   determining, based on the sequence number i of the direction vector of the first electric wave, a polarized transmitting antenna for transmitting the second electric wave; and
   transmitting the second electric wave by using the polarized transmitting antenna.

5. A quantum communication method, applied to a communication apparatus, the method comprising:
   receiving a second electric wave, wherein the second electric wave is obtained by modulating a first symbol to one of M direction vectors of a first electric wave based on a preset mapping relationship, the first symbol is a symbol corresponding to first data, and M is a positive integer;
   converting the second electric wave into N energy quantum sets, wherein one energy quantum set is an empty set or comprises at least one energy quantum, and N is a positive integer;
   determining a first distribution result of the N energy quantum sets, and determining, based on the first distribution result, that the second electric wave corresponds to an $i^{th}$ direction vector of the first electric wave, wherein the $i^{th}$ direction vector is one of the M direction vectors of the first electric wave, and i is an integer; and
   determining the first symbol based on the $i^{th}$ direction vector of the first electric wave and the preset mapping relationship.

6. The method according to claim 5, wherein the converting the second electric wave into the N energy quantum sets comprises:
   converting the second electric wave into the N energy quantum sets based on an energy conversion relationship between an electric wave and an energy quantum.

7. The method according to claim 5, wherein the converting the second electric wave into the N energy quantum sets comprises:
   converting, for a $k^{th}$ time window in N time windows, the second electric wave into one energy quantum set, wherein k takes each value from 1 to N, and an accumulated value of the N time windows is duration of transmitting the first symbol.

8. The method according to claim 5, wherein the determining the first distribution result of the N energy quantum sets comprises:
   determining a quantity of energy quanta in each of the N energy quantum sets, to obtain N second distribution results, wherein one energy quantum set corresponds to one second distribution result; and
   collecting statistics about the N second distribution results, to obtain the first distribution result.

9. The method according to claim 5, wherein the determining, based on the first distribution result, that the second electric wave corresponds to an $i^{th}$ direction vector of the first electric wave comprises:

determining, based on the first distribution result and M pre-stored eigenstates $q_i$, that the second electric wave corresponds to the $i^{th}$ direction vector of the first electric wave, wherein the eigenstate $q_i$ is a distribution result of the N energy quantum sets that is obtained in response to the $i^{th}$ direction vector of the first electric wave carries carrying no symbol, the M eigenstates $q_i$ corresponds one-to-one to the M direction vectors of the first electric wave, and i takes each value from 1 to M.

10. The method according to claim 9, wherein the determining, based on the first distribution result and M pre-stored eigenstates $q_i$, that the second electric wave corresponds to the $i^{th}$ direction vector of the first electric wave comprises:

obtaining M convolutional peak values $\hat{s}_1$ according to $\hat{s}_1 = \text{argmax}_i\, p(s)*q_i$, wherein p(s) is the first distribution result; and determining that an i value corresponding to a largest value in the M convolutional peak values $\hat{s}_1$ is a sequence number i of a direction vector of the first electric wave, wherein the direction vector that is of the first electric wave and whose sequence number is i is the $i^{th}$ direction vector of the first electric wave.

11. The method according to claim 5, wherein the receiving the second electric wave comprises:

separately receiving the second electric wave by using M polarized receiving antennas.

12. The method according to claim 5, wherein before the converting the second electric wave into the N energy quantum sets, the method further comprises either or both of the following:

filtering the second electric wave; and
amplifying the second electric wave.

13. The method according to claim 5, wherein the converting the second electric wave into the N energy quantum sets comprises:

converting the second electric wave into the N energy quantum sets in response to a temperature of an environment in which the second electric wave is located being lower than a temperature threshold.

14. A communications apparatus, comprising at least one non-transitory memory and at least one processor, wherein:

the at least one non-transitory memory is configured to store a processor-executable instruction; and the at least one processor, when executing the instruction, is configured to:

receive a second electric wave, wherein the second electric wave is obtained by modulating a first symbol to one of M direction vectors of a first electric wave based on a preset mapping relationship, the first symbol is a symbol corresponding to first data, and M is a positive integer;

convert the second electric wave from the receiving antenna into N energy quantum sets, wherein one energy quantum set is an empty set or comprises at least one energy quantum, and N is a positive integer;

determine a first distribution result of the N energy quantum sets from the electric wave energy quantum converter;

determine, based on the first distribution result, that the second electric wave corresponds to an $i^{th}$ direction vector of the first electric wave, and determine the first symbol based on the $i^{th}$ direction vector of the first electric wave and the preset mapping relationship, wherein the $i^{th}$ direction vector is one of the M direction vectors of the first electric wave, and i is an integer.

15. The communications apparatus according to claim 14, wherein that the at least one processor is configured to convert the second electric wave from the receiving antenna into the N energy quantum sets comprises:

converting the second electric wave into the N energy quantum sets based on an energy conversion relationship between an electric wave and an energy quantum.

16. The communications apparatus according to claim 14, wherein that the at least one processor is configured to convert the second electric wave from the receiving antenna into the N energy quantum sets comprises:

converting, for a $k^{th}$ time window in N time windows, the second electric wave into one energy quantum set, wherein k takes each value from 1 to N, and an accumulated value of the N time windows is duration of transmitting the first symbol.

17. The communications apparatus according to claim 14, wherein the at least one processor is further configured to:

determine a quantity of energy quanta in each of the N energy quantum sets from the electric wave energy quantum converter; and obtain N second distribution results based on the quantity that is of energy quanta in each of the N energy quantum sets and that is from the energy quantum counter module, and collect statistics about the N second distribution results, to obtain the first distribution result, wherein one energy quantum set corresponds to one second distribution result.

18. The communications apparatus according to claim 14, wherein the at least one processor is further configured to determine, based on the first distribution result from the energy quantum statistics module and M pre-stored eigenstates $q_i$, that the second electric wave corresponds to the $i^{th}$ direction vector of the first electric wave, wherein the eigenstate $q_i$ is a distribution result of the N energy quantum sets that is obtained when the $i^{th}$ direction vector of the first electric wave carries no symbol, the M eigenstates $q_i$ corresponds one-to-one to the M direction vectors of the first electric wave, and i takes each value from 1 to M.

19. The communications apparatus according to claim 18, wherein that the at least one processor is configured to determine, based on the first distribution result from the energy quantum statistics module and M pre-stored eigenstates $q_i$, that the second electric wave corresponds to the $i^{th}$ direction vector of the first electric wave comprises:

obtaining M convolutional peak values $\hat{s}_1$ according to $\hat{s}_1 = \text{argmax}_i\, p(s)*q_i$, wherein p(s) is the first distribution result; and determining that an i value corresponding to a largest value in the M convolutional peak values $\hat{s}_1$ is a sequence number i of a direction vector of the first electric wave, wherein the direction vector that is of the first electric wave and whose sequence number is i is the $i^{th}$ direction vector of the first electric wave.

20. The communications apparatus according to claim 14, wherein the communications apparatus further comprises a refrigerator, wherein the refrigerator is configured to refrigerate the electric wave energy quantum converter.

* * * * *

UNITED STATES PATENT AND TRADEMARK OFFICE
CERTIFICATE OF CORRECTION

PATENT NO. : 11,476,950 B2
APPLICATION NO. : 17/390473
DATED : October 18, 2022
INVENTOR(S) : Gong et al.

It is certified that error appears in the above-identified patent and that said Letters Patent is hereby corrected as shown below:

On the Title Page

Item (71) Applicants: "Huawei Technologies Co., Ltd., Shenzhen (CN); UNIVERSITY OF SCIENCE AND TECHNOLOGY OF CHINA, Anhui (CN)" should read -- Huawei Technologies Co., Ltd., Shenzhen (CN); UNIVERSITY OF SCIENCE AND TECHNOLOGY OF CHINA, Hefei (CN) --.

In the Claims

Claim 9: Column 29, Lines 7-8: "direction vector of the first electric wave carries carrying" should read -- direction vector of the first electric wave carrying --.

Signed and Sealed this
Twenty-first Day of March, 2023

Katherine Kelly Vidal
*Director of the United States Patent and Trademark Office*